US012300280B1

(12) United States Patent
Suzuki et al.

(10) Patent No.: US 12,300,280 B1
(45) Date of Patent: May 13, 2025

(54) METHODS AND APPARATUS FOR IDENTIFYING SUBSTRATES SUITABLE FOR MAGNETIC RECORDING MEDIA

(71) Applicant: Western Digital Technologies, Inc., San Jose, CA (US)

(72) Inventors: Shoji Suzuki, San Jose, CA (US); Tao Wang, Shenzhen (CN); Lulu Xiao, Shenzhen (CN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/749,382

(22) Filed: Jun. 20, 2024

(30) Foreign Application Priority Data

Jun. 19, 2024 (CN) .......................... 202410792654.6

(51) Int. Cl.
*G11B 5/54* (2006.01)
*G11B 5/455* (2006.01)

(52) U.S. Cl.
CPC .................... *G11B 5/455* (2013.01)

(58) Field of Classification Search
CPC .......... G11B 5/54; G11B 5/82; G11B 5/5526; G11B 25/043; G11B 17/32;
(Continued)

(56) References Cited

U.S. PATENT DOCUMENTS 5,497,085 A 3/1996 Tian et al.
8,896,964 B1 * 11/2014 Adachi ................ G11B 5/4813
360/99.15
(Continued)

FOREIGN PATENT DOCUMENTS

JP 2007193932 A 8/2007
JP 2013025844 A 2/2013
(Continued)

OTHER PUBLICATIONS

Li, Xu Hong, "Numerical Simulation of Slider Air Bearings in Head-Disk Interface System based on a Mesh-Free Method", School of Mechanical & Aerospace Engineering; Nanyang Technological University; 2006; https://doi.org/10.32657/10356/6078; 250 pages.
(Continued)

*Primary Examiner* — Nabil Z Hindi
(74) *Attorney, Agent, or Firm* — LOZA & LOZA LLP; Gabriel Fitch

(57) ABSTRACT

Methods and apparatus of identifying a substrate suitable for a magnetic medium of a data storage device configured for magnetic recording are described. In an aspect, the method includes determining a roll-off value, a ski-jump value, and a radial-waviness value, each associated with an outer diameter (OD) edge region of a data surface of the substrate, and determining a calculated minimum fly height between a slider of the data storage device and a data surface of the substrate in the OD edge region based on the roll-off value, the ski-jump value, and the radial-waviness value. The method further includes comparing the calculated minimum fly height and a fly height threshold, and determining whether to utilize the substrate for the magnetic medium based on the comparison of the calculated minimum fly height and the fly height threshold.

20 Claims, 17 Drawing Sheets

(58) Field of Classification Search
CPC ............ G11B 5/73921; G11B 19/2009; G11B 33/121; G11B 33/08; G11B 5/4886; G11B 5/6005

See application file for complete search history.

(56) References Cited

U.S. PATENT DOCUMENTS

| | | |
|---|---|---|
| 9,183,866 B2 | 11/2015 | Takizawa et al. |
| 9,799,364 B2 | 10/2017 | Adachi et al. |
| 10,607,647 B2 | 3/2020 | Takizawa et al. |
| 2002/0135362 A1 | 9/2002 | Lee et al. |

FOREIGN PATENT DOCUMENTS

| | | |
|---|---|---|
| JP | 2013140649 A | 7/2013 |
| WO | 2006025572 A1 | 3/2006 |

OTHER PUBLICATIONS

Matthes, Liane M. et al., "Near Contact Thermal Flying Height Control in Hard Disk Drives", IEEE Transactions on Control Systems Technology; vol. 25, Issue 1; Jan. 2017; https://ieeexplore.ieee.org/document/7448419; 5 pages.

Qian, Weimin et al., "Disk Shape and Its Effect on Flyability", IEEE Transactions on Magnetics; vol. 39, Issue 2; Mar. 2003; https://ieeexplore.ieee.org/document/1190093; 5 pages.

Suzuki, S., et al., "Effect of Radial Curvature of Magnetic Media on Glide Avalanche", IEEE Transactions on Magnetics; vol. 41, Issue 2; Feb. 2005; https://ieeexplore.ieee.org/document/1396193; 4 pages.

\* cited by examiner

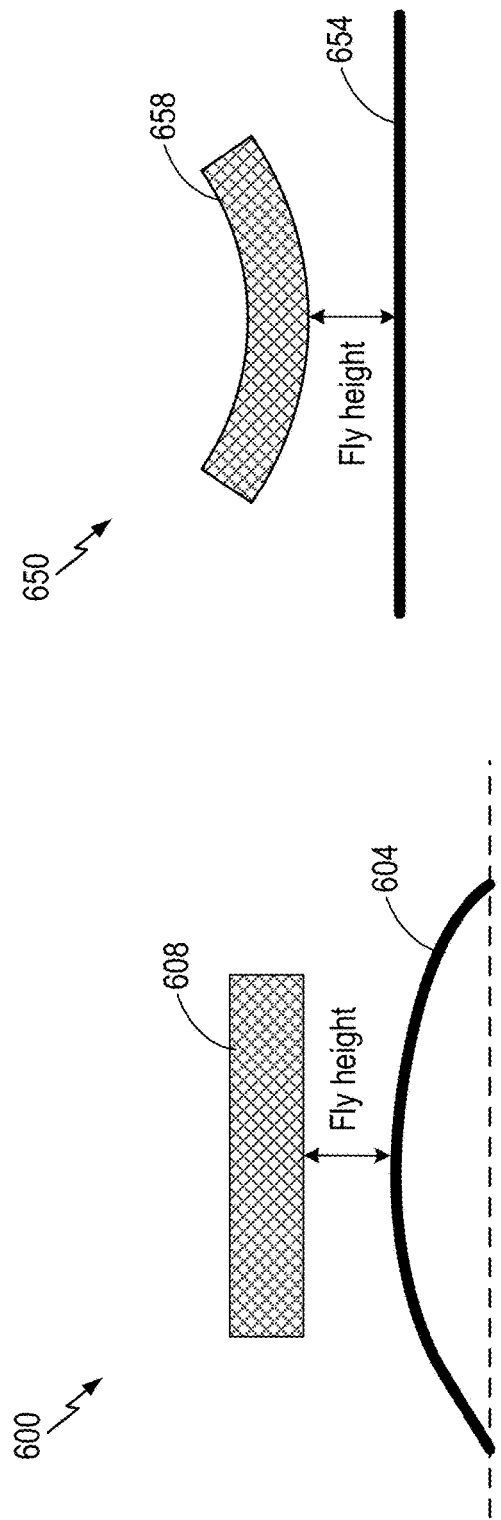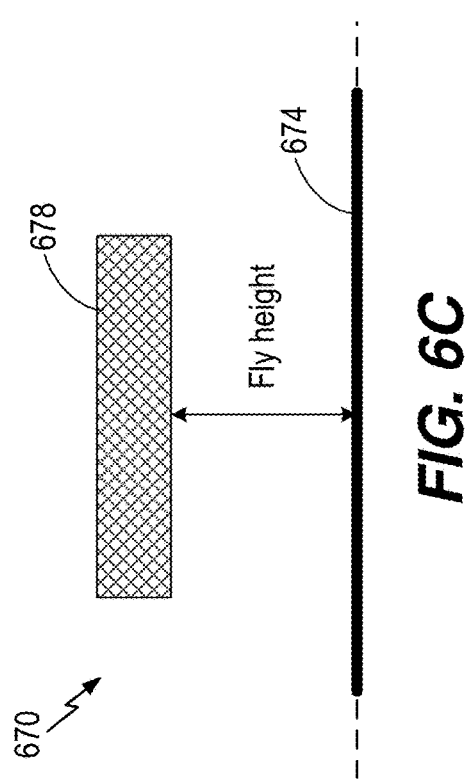

| | Slider 1 | Slider 2 | Slider 3 |
|---|---|---|---|
| $k_1$ | 0.015 | 0.0246 | 0.0037 |
| $k_2$ | 0.1546 | 0.256496 | 0.038579 |
| $k_3$ | 0.9912 | 1.625568 | 0.244496 |

☐ Determined by simulation with measurements

☐ Determined by ratios

| | Min | Max |
|---|---|---|
| $k_1$ | 0.003 | 0.030 |
| $k_2$ | 0.030 | 0.300 |
| $k_3$ | 0.200 | 2.000 |

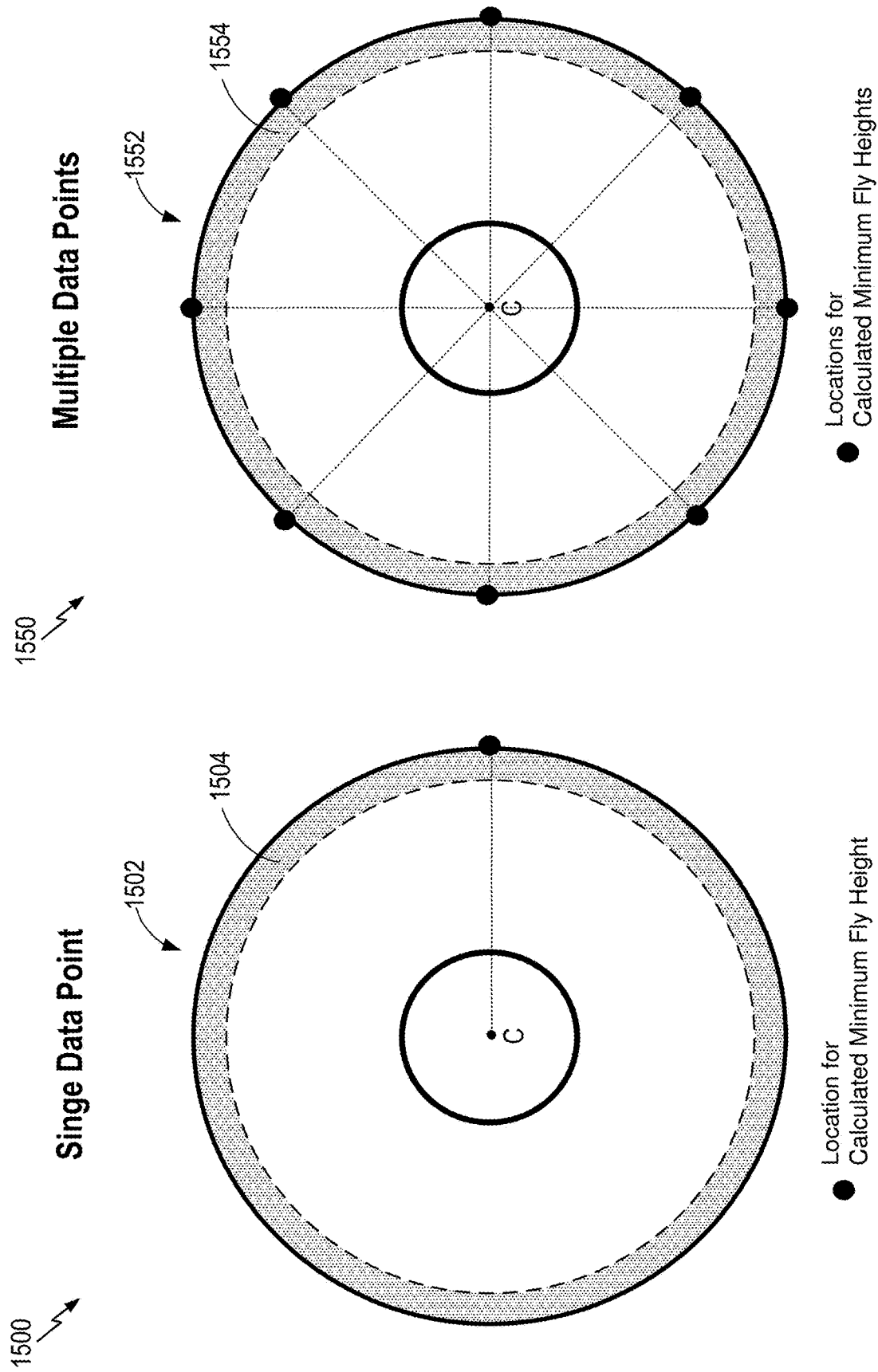

METHODS AND APPARATUS FOR IDENTIFYING SUBSTRATES SUITABLE FOR MAGNETIC RECORDING MEDIA

CROSS-REFERENCE TO RELATED APPLICATIONS

This application claims priority to and the benefit of Patent Application No. 202410792654.6, filed Jun. 19, 2024 in the People's Republic of China, entitled "METHODS AND APPARATUS FOR IDENTIFYING SUBSTRATES SUITABLE FOR MAGNETIC RECORDING MEDIA," the entire content of which is incorporated herein by reference.

FIELD

The present disclosure relates to magnetic recording media, and more specifically, to methods for identifying substrates suitable for a magnetic recording medium of a data storage device configured for magnetic recording.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage/recording media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate (such as a glass substrate and/or glass ceramic substrate), a conductive pre-seed layer may be deposited on the non-conductive substrate so that a bias voltage can be applied during the deposition of some or all of the subsequent media films to form the magnetic storage media. In some aspects, during a processing stage of the substrate, a surface of the substrate may not be uniform and may have height variations and/or irregularities. These height variations and/or irregularities may be considered in determining whether the substrate is suitable for a magnetic medium of a data storage device.

SUMMARY

In one aspect, a method of identifying a substrate suitable for a magnetic medium of a data storage device configured for magnetic recording is provided. The method includes determining a roll-off value, a ski-jump value, and a radial-waviness value, each associated with an outer diameter (OD) edge region of a data surface of the substrate, and determining a calculated minimum fly height between a slider of the data storage device and a data surface of the substrate in the OD edge region based on the roll-off value, the ski-jump value, and the radial-waviness value. The method further includes comparing the calculated minimum fly height and a fly height threshold, and determining whether to utilize the substrate for the magnetic medium based on the comparison of the calculated minimum fly height and the fly height threshold.

In another aspect, a method of identifying a substrate suitable for a magnetic medium of a data storage device configured for magnetic recording is provided. The method includes determining a roll-off value, a ski-jump value, and a radial-waviness value, each associated with an OD edge region of a data surface of the substrate, and determining a calculated minimum fly height between a slider of the data storage device and a data surface of the substrate in the OD edge region based on the roll-off value, the ski-jump value, and the radial-waviness value. Further, the method includes determining whether the calculated minimum fly height is less than a fly height threshold. The method further includes determining, responsive to a determination that the calculated minimum fly height is greater than or equal to the fly height threshold, to use the substrate within the magnetic medium of the data storage device. The method further includes determining, responsive to a determination that the calculated minimum fly height is less than the fly height threshold, not to use the substrate within the magnetic medium of the data storage device.

BRIEF DESCRIPTION OF THE DRAWINGS

FIG. 6A illustrates example fly height deviations for a curved substrate surface, according to some aspects.

FIG. 6B illustrates example fly height deviations for a curved slider, according to some aspects.

FIG. 6C illustrates example fly heights for an uncurved substrate surface and an uncurved slider, according to some aspects.

FIG. 14A shows an example table related to an approach for determining sensitivity factors of different slider types based on ratios of known sensitivity factors, according to some aspects.

FIG. 14B shows an example table of ranges for different sensitivity factors based on the sensitivity factors shown in FIG. 14A, according to some aspects.

FIG. 15A illustrates an example approach for determining whether to utilize a substrate for a magnetic medium based on comparison of a single calculated minimum fly height and a fly height threshold, according to some aspects.

FIG. 15B illustrates an example approach for determining whether to utilize a substrate for a magnetic medium based on comparison of multiple calculated minimum fly heights and a fly height threshold, according to some aspects.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

As discussed above, certain height variations and/or irregularities on the surface of substrates (e.g., glass or metal substrates) may cause problems for magnetic recording systems and thereby render the substrates unsuitable for use therein. Methods of characterizing substrates for use in magnetic recording systems tend to focus on the overall flatness of the substrates. Herein, new methods of characterizing substrates are presented wherein instead of focusing on the overall flatness, the methods consider various types of characteristics related to the shape of the substrate surface in an outer diameter (OD) edge region of the substrate. In particular, a roll-off value, a ski-jump value, and a radial-waviness value at a particular location in the OD edge region are considered together to calculate a minimum fly height, which is then compared with a fly height threshold. The roll-off value indicates a difference between a highest point and a lowest point in the OD edge region within a limited area, the ski-jump value indicates how high the surface is raised in the OD edge region with respect to a flat portion of the substrate, and the radial-waviness indicates how much the surface varies in height in a radial direction. If the calculated minimum fly height is greater than or equal to the fly height threshold, the substrate is acceptable for use within the magnetic medium. FIGS. 1-8 introduce one or more examples of a magnetic recording system and details of the substrates that may be used therein. The remaining figures describe the new methods for characterizing substrates using the roll-off value(s), the ski-jump value(s), and the radial-waviness value(s). While the inventive techniques are presented herein primarily featuring glass substrates, the inventive techniques can also apply to substrates made of other suitable materials (e.g., metal) where the substrates are subjected to polishing and therefore have the height variations and/or irregularities noted above.

Figure 1A:
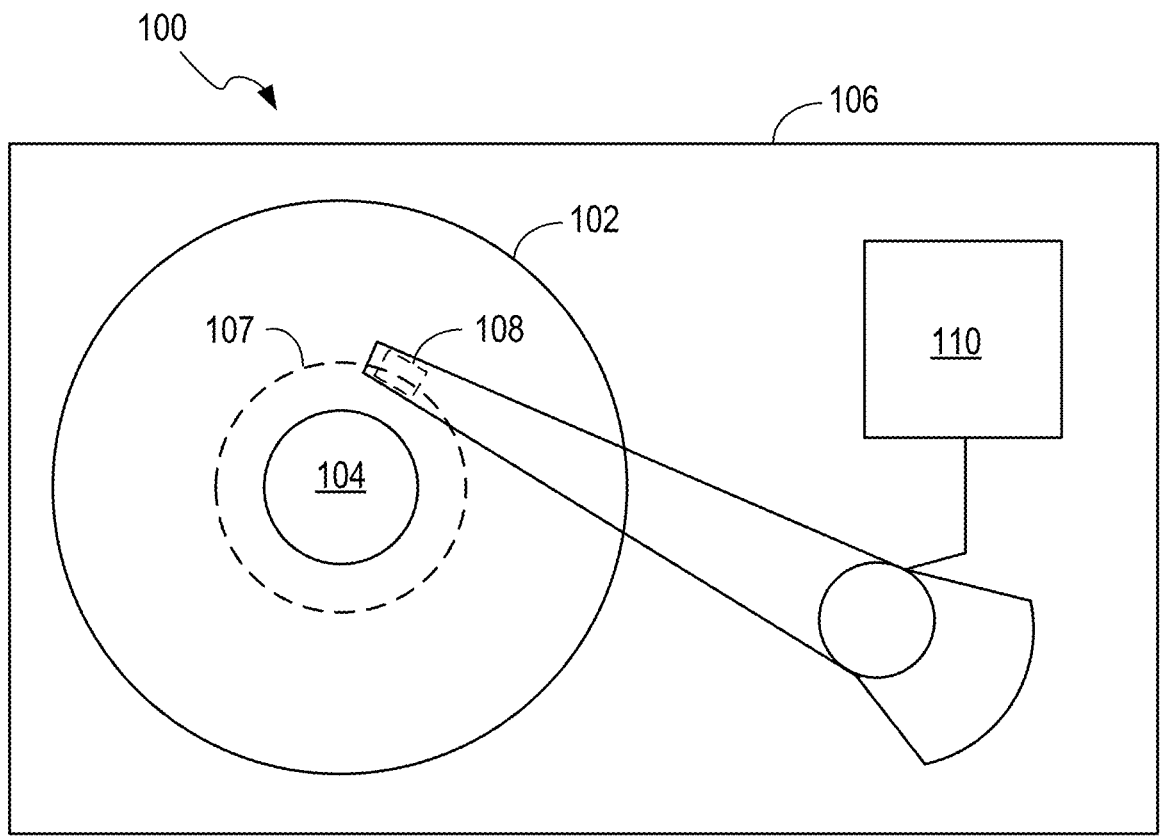
FIG. 1A illustrates a top plan view of a data storage device including a disk shaped magnetic recording medium (magnetic recording disk) in accordance with some aspects.

FIG. 1A is a top schematic view of a data storage device 100 configured for magnetic recording and including a disk shaped magnetic recording medium 102 in accordance with some aspects of the disclosure. In illustrative examples, the magnetic recording medium 102 is configured for perpendicular magnetic recording (PMR). However, other recording media, such as media configured for heat assisted magnetic recording (HAMR) or microwave assisted magnetic recording (MAMR) may be used in other examples. The magnetic storage device 100 may include one or more disks/media 102 to store data. Disk/media 102 resides on a spindle assembly 104 that is mounted to drive housing 106. Data may be stored along tracks 107 along the magnetic recording layer of disk 102. The reading and writing of data are accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 1B:
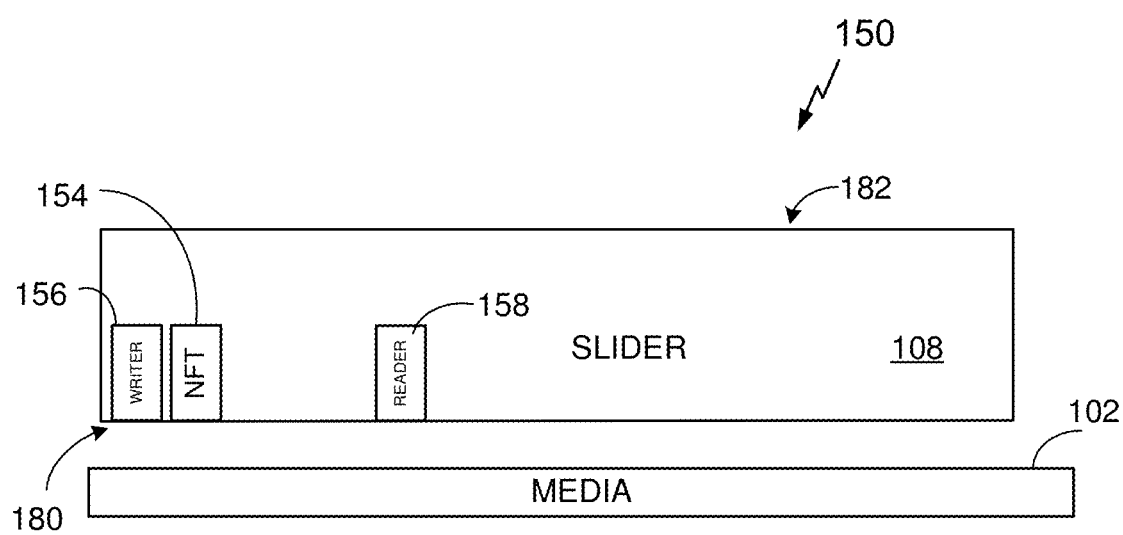
FIG. 1B illustrates a profile view of a slider and the magnetic recording medium of FIG. 1A in accordance with some aspects.

FIG. 1B illustrates a profile view of the slider 108 and the magnetic recording medium 102 of FIG. 1A in accordance with some aspects of the disclosure. In particular, FIG. 1B illustrates an assembly 150 that includes the slider 108, a near-field transducer (NFT) 154 (if the head is configured for heat assisted magnetic recording (HAMR)), a writer 156 and a reader 158. It is noted that FIG. 1B is not drawn to scale and generally the slider 108 is substantially smaller than the media 102 (e.g., as shown in FIG. 1A). The NFT 154 may be omitted in a non-HAMR slider, and other components may be used instead in other types of energy assisted recording technology (e.g., a spin torque oscillator (STO) in a microwave assisted magnetic recording (MAMR) head). The assembly 150 may further include a laser (not shown) configured to direct light energy to the NFT 154 during a writing process, wherein the NFT may generate localized heat energy, in response to the light energy, to assist the writing process. The laser may be mounted to, or made integral to, the slider 108. If the slider 108 is not configured for HAMR (e.g., is configured for non-HAMR applications), the laser and NFT may be omitted. The assembly 150 is positioned over the media 102. The slider 108 may be one component or several components. The slider 108 may include a slider body and a slider head. In some implementations, a slider head may be a separate component that may be integrated with the slider 108. The NFT 154, the writer 156 and the reader 158 may be implemented in the slider, the slider head or combinations thereof.

The slider 108 includes a first surface 180 (e.g., bottom surface) that faces the media 102. The first surface 180 may be referred to as an air bearing surface (ABS). The slider 108 also includes a second surface 182 (e.g., top surface) that faces away from the media 102. The NFT 154, the writer 156 and the reader 158 may be located near or along the first surface 180 of the slider 108. The writer 156 may be a writing element (e.g., means for writing data) for writing data on the media 102, and the reader 158 may be a reading element (e.g., means for reading data) for reading data on the media 102. The writer 156 may include a write pole.

Figure 2:
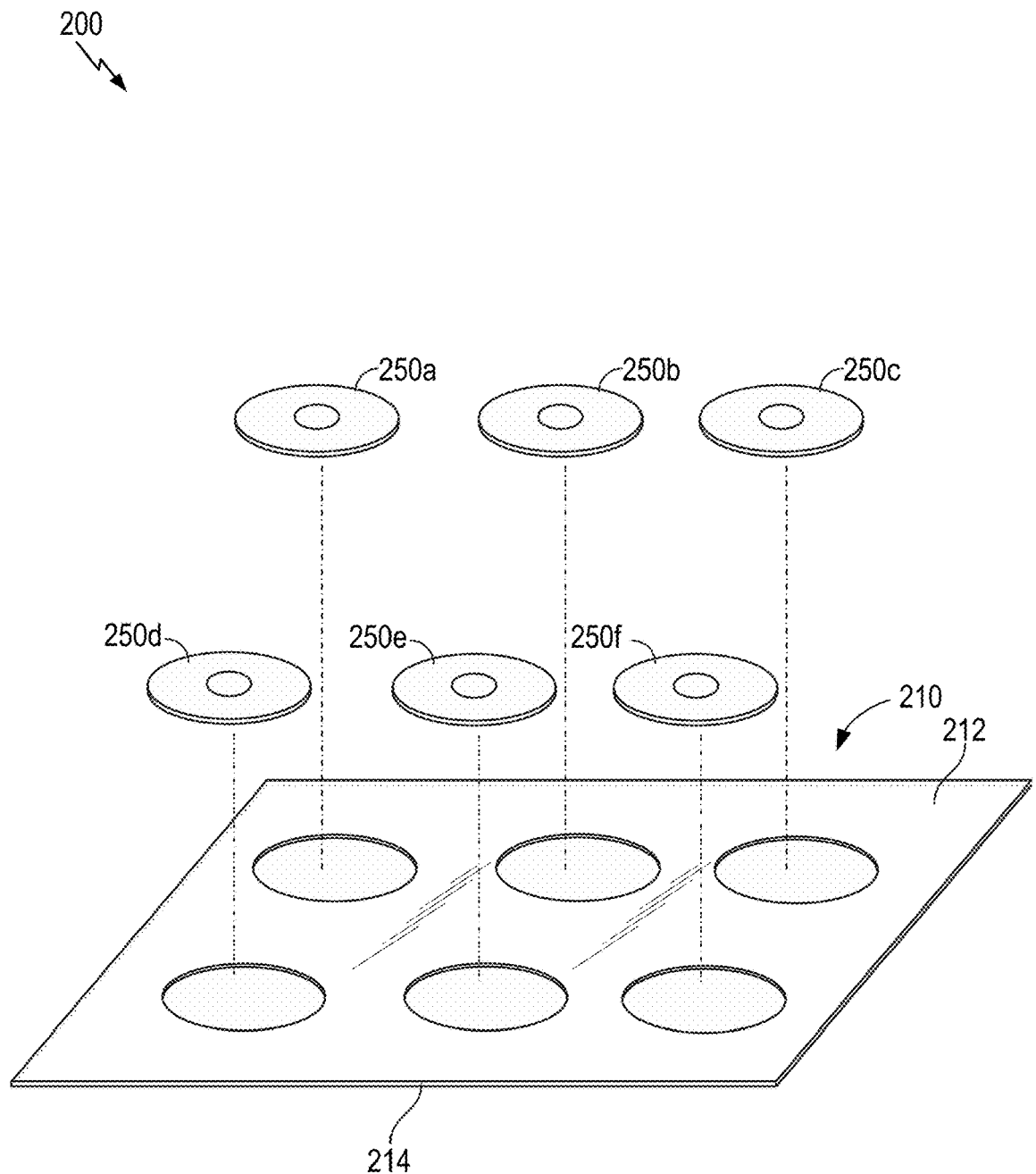
FIG. 2 illustrates an example fabrication process of glass substrate disks from a glass sheet that are configured to be further processed to form magnetic recording disks in accordance with some aspects.

FIG. 2 illustrates an example fabrication process of glass substrate disks from a glass sheet that are configured to be further processed to form magnetic recording disks in accordance with some aspects. To manufacture a magnetic recording disk such as the disk 102 of FIG. 1A, a glass sheet may be cut into multiple glass substrate disks, and the glass substrate disks may be further processed to form magnetic recording disks (e.g., using one or more deposition processes wherein at least one magnetic recording layer is added). As shown in FIG. 2, for example, a glass sheet 210 with a first surface 212 and a second surface 214 are cut into glass substrate disks 230a, 230b, 230c, 230d, 230e, and 230f, which are then processed to form magnetic recording disks (e.g., after undergoing further cutting and various deposition steps). In some examples, the glass sheet may be divided into multiple regions from which multiple glass substrate disks for magnetic recording disks are cut. In the example illustrated in FIG. 2, the glass sheet 210 is divided into six regions, and the glass substrates 230a, 230b, 230c, 230d, 230e, and 230f are cut from the six regions, respectively. In other examples, the glass sheet may be divided into less than or greater than six regions depending on the size of the glass substrates desired and the size of the glass sheet.

A glass sheet is generally an unfinished sheet of glass that may have foreign substances, defects, and/or roughness. Glass substrate disks for the magnetic recording disks generally require a smooth surface with few or no defects. Therefore, after cutting the glass sheet into glass substrate disks, multiple polishing steps and/or a lapping process may be applied to each glass substrate disk to achieve the desired smoothness in the surface and/or to adjust a thickness of the glass substrate.

Figure 3A:
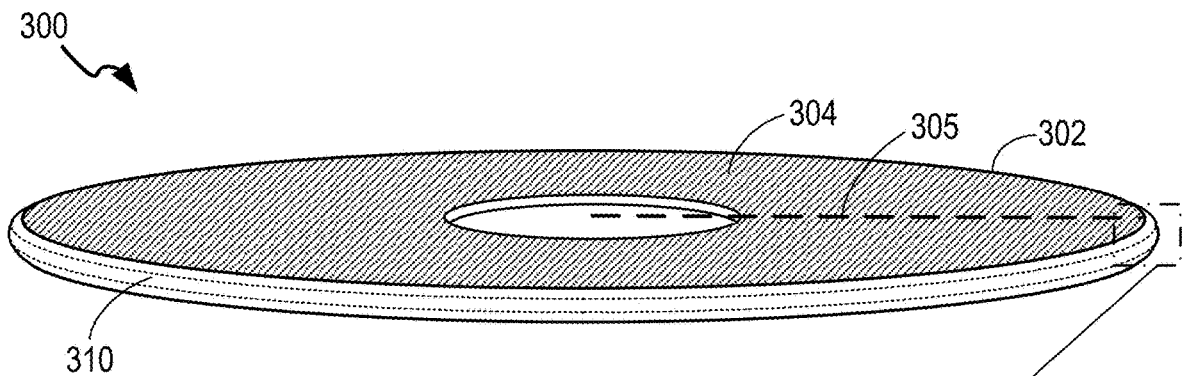
FIG. 3A illustrates an example substrate disk for magnetic recording, according to some aspects.
Figure 3B:
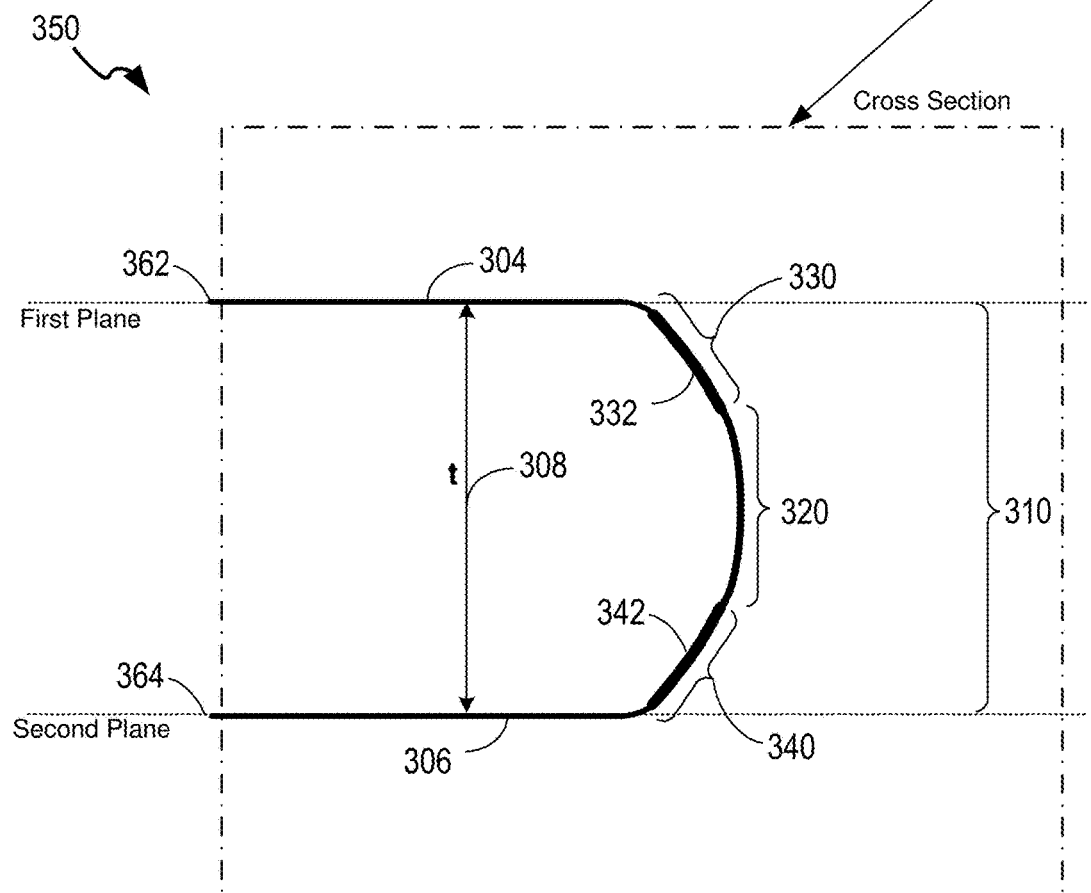
FIG. 3B illustrates an example expanded view of a cross section of a portion near an OD edge of the substrate disk of FIG. 3A.

FIGS. 3A and 3B illustrate example diagrams showing a substrate disk and a cross section of a portion near an outer diameter (OD) edge of the substrate disk, according to some aspects. FIG. 3A illustrates an exemplary diagram 300 showing a substrate disk 302 for magnetic recording. FIG. 3B illustrates an example view 350 of a cross section of a portion near an OD edge of the substrate disk 302. The cross section shown in FIG. 3 may be taken along a plane perpendicular to a first surface 304 and along a radial line 305 of the substrate disk 302. The substrate disk 302, which may be configured for magnetic recording, may have the first surface 304 extending along a first plane 362 and a second surface 306 extending along a second plane 364 parallel to the first plane 362. The first surface 304 may be a data surface where data may be magnetically recorded in a magnetic recording layer of the substrate disk 302 (e.g., once it has been deposited). For example, the data may be recorded in the magnetic recording layer of the substrate disk 302 using a recording head (e.g., recording head 108). The substrate disk 302 may further have an OD edge 310 along a perimeter edge of the substrate disk 302. The OD edge 310 of the substrate disk 302 may include an edge surface 320, a first chamfer 330, and a second chamfer 340. The edge surface 320 is disposed along a perimeter of the substrate disk 302 and between the first surface 304 and the second surface 306. The first chamfer 330 is disposed between the first surface 304 and the edge surface 320, and the second chamfer 340 is disposed between the second surface 306 and the edge surface 320. A disk thickness (t) 308 is the thickness between the first surface 304 and the second surface 306, and may be measured along a direction substantially normal to the first surface 304 or the second surface 306. In some aspects, the disk thickness may be less than or equal to 0.5 mm.

An OD edge region is a region at or around an OD edge and includes the outer end of the data surface of a substrate disk, a first chamfer that is disposed at the end of the data surface, and an edge surface that is disposed at the other end of the first chamfer. For example, as shown in FIGS. 3A and 3B, in an OD edge region, the outer end of the first surface 304 being the data surface of the substrate disk 302 extends to the first chamfer 330 and the first chamfer 330 extends to the edge surface 320, where the data surface is used to record data. Because natural pressure variations may exist in the OD edge region at or around the OD edge, the polishing process may cause height variations in the OD edge region.

Figure 4:
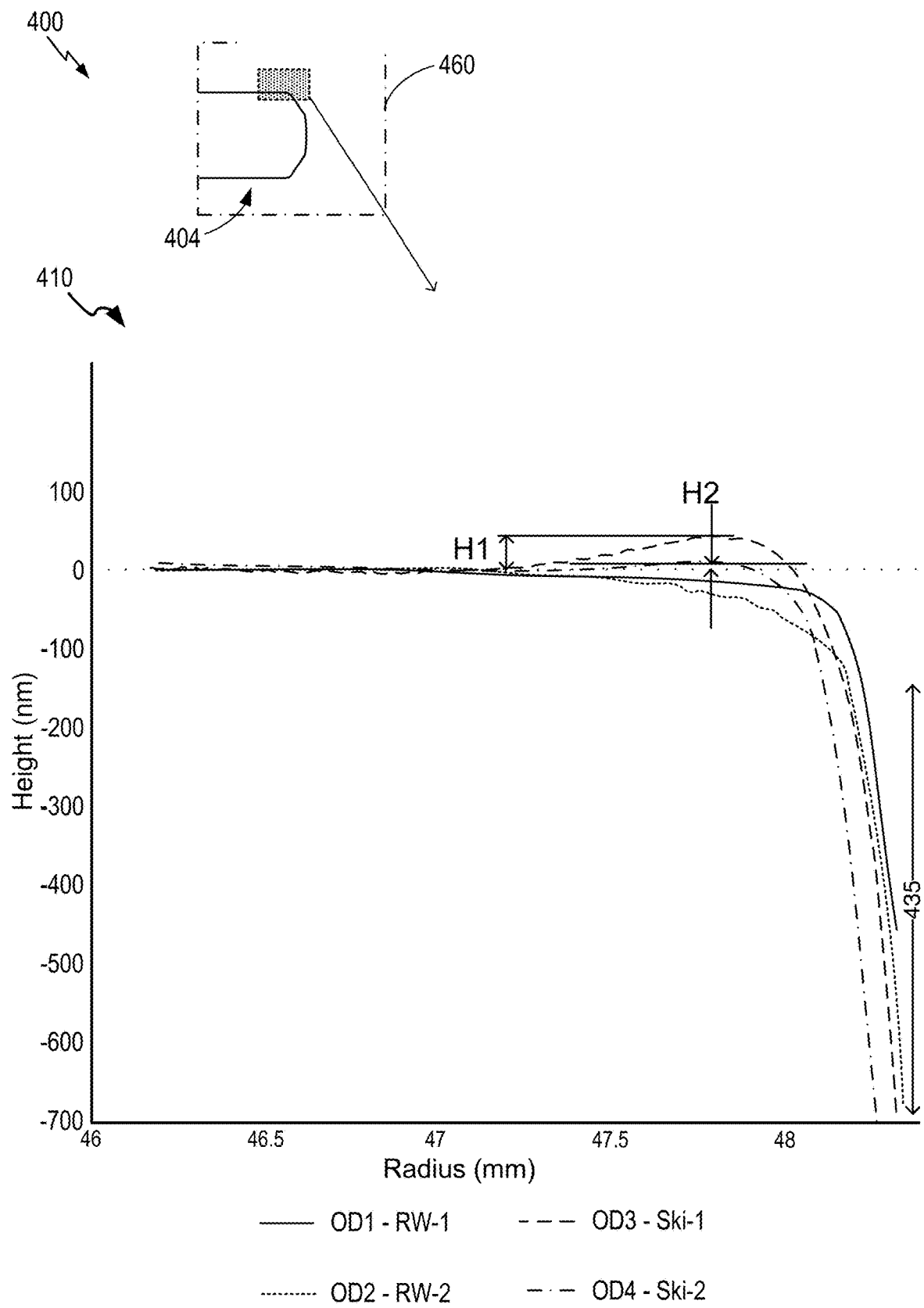
FIG. 4 illustrates example OD (height) profiles of different OD edge regions, according to some aspects.

FIG. 4 is an example diagram 400 showing OD profiles at different OD edge regions, according to some aspects. In some aspects, the OD profiles may be taken from respective OD edge regions of different substrates. Each profile in FIG. 4 shows height values along a top surface of a substrate at various radiuses (e.g., radial distances from the center of the substrate). In FIG. 4, each of the OD profiles shown in an OD profile plot 410 corresponds to an OD edge region as shown in a cross-section view 460 of a respective substrate disk 404. The cross-section view 460 may correspond to the cross section diagram 350 shown in FIG. 3B.

In the example shown in FIG. 4, the OD profile of a first OD edge region (OD1) and the OD profile of a second OD edge region (OD2) have roll-off regions between a data surface and a transition region 435 disposed between the data surface and a chamfer region of the substrate disk, where the roll-off regions show a gradual roll off from the data surface to the transition region 435. On the other hand, the OD profile of a third OD edge region (OD3) and the OD profile of a fourth OD edge region (OD4) have ski-jump regions between the data surface and the transition region 435, where the height drastically increases between the data surface and a start of the transition region 435 before dropping at the transition region 435. One way to quantify such deviations is to measure the height differences (e.g., H1, H2) between the data surface and a certain point at the OD edge region. The height differences may be referred to as ski-jump values. In an aspect, the ski-jump values may be determined by measuring or calculating a height difference between a baseline point (e.g., at 0) and the highest point before reaching the transition region 435, where the baseline point is a height at the data surface of the substrate. Hence, in some examples, a ski-jump value may be determined based on a highest point with respect to the data surface in the OD edge region and the lowest point with respect to the data surface. For example, the ski-jump values for OD3 are shown as H1 and the ski-jump values for OD4 are shown as H2, which is smaller than H1. As discussed above, this ski-jump value/height difference, taken over a surface of the substrate, may be considered to determine whether the substrate is sufficiently flat to be used for magnetic recording.

Figure 5A:
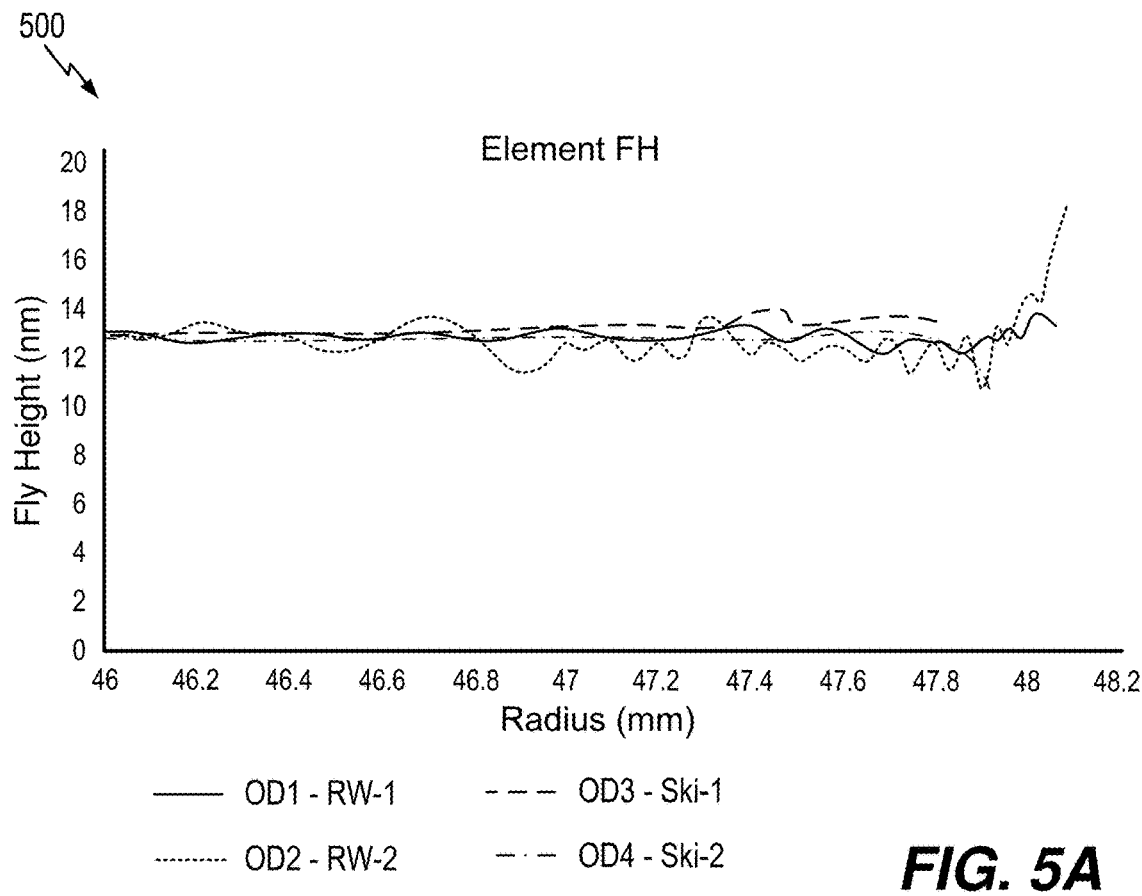
FIG. 5A is an example plot of read-write element fly heights at various radiuses for various OD edge regions, according to some aspects.

FIG. 5A is an example plot 500 of read-write element fly heights at various radiuses for various OD edge regions, according to some aspects. The read-write element fly heights indicate spacing between a read-write element of the slider and various locations on a data surface of a substrate, where each location is the point of the disk directly below (e.g., closest to) the read-write element. The read-write element fly heights (e.g., element fly height) shown in FIG. 5A respectively correspond to the OD profiles of OD1, OD2, OD3, and OD4 of FIG. 4B, at various radiuses. As shown in FIG. 5A, the read-write element fly heights fluctuate over the radiuses. The degree of fluctuation of the read-write element fly heights vary depending on the OD profiles.

Fly height is generally defined as the spacing between the disk surface (e.g., average mean surface of the disk) and the head/slider or a selected point on the slider. As discussed above, the disk surface is often fairly rough (e.g., not entirely flat) and various conditions, including active (e.g., protruding bulge of a read-write element) or passive (e.g., reactive tilt of slider to various disk surface conditions), may cause one portion of the slider to be closer to the disk surface than the rest of the slider. As a result, it is helpful to define a minimum fly height. As used herein, a minimum fly height is the smallest spacing between the highest point of a disk surface (e.g., within a localized area beneath the slider) and the lowest point of the slider. In an example where the slider is positioned over a particular small area (e.g., localized area) on a data surface of a substrate, multiple fly heights may be determined for various points on the surface of the slider and corresponding points in the particular small area, where each fly height is a spacing or distance between a respective point on the surface of the slider and a corresponding point (e.g., directly below) on the particular small area on the data surface. In this example, the smallest value among the multiple fly heights is the minimum fly height for the particular small area on the data surface that corresponds to the surface of the slider. As the slider moves, the particular small area on the data surface also changes. In an example, the minimum fly height may be determined by determining the shortest distance between the lowest point on the slider and the highest peak on the data surface, in the localized area that corresponds to the slider position.

Waviness in a radial direction, or radial-waviness, (along a radial direction from a center of a substrate to the OD) may represent variations in height values in the radial direction with respect to the data surface of the substrate, as shown in an OD profile. In an example, the radial-waviness may have a minimum height variation whose pitch (e.g., wavelength) is smaller than a width of the air bearing surface. The degree of the radial-waviness may provide important information on roughness of the data surface of the substrate. Further, variations in minimum fly heights may be high if the radial-waviness is high.

Figure 5B:
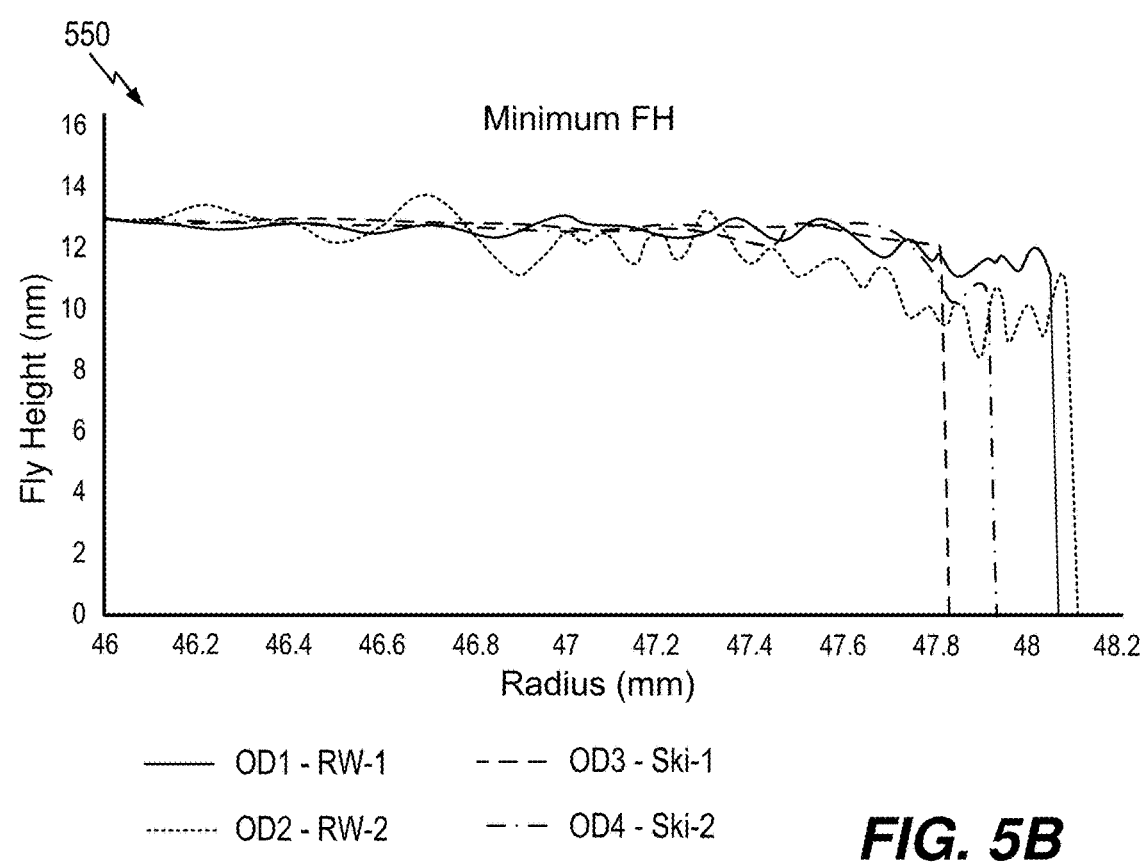
FIG. 5B is an example plot of minimum fly heights at various radiuses of the substrate for various OD edge regions, according to some aspects.

FIG. 5B is an example plot 550 of minimum fly heights at various radiuses of the substrate for various OD edge regions, according to some aspects. The minimum fly heights shown in FIG. 5B respectively correspond to the OD profiles of OD1, OD2, OD3, and OD4 of FIG. 4B, at various radiuses. The minimum fly heights are important parameters predicting reliability in reading data using the slider. For example, the minimum fly height may be zero at a certain point and thus the slider is touching the data surface of the substrate. In operation, this contact can happen while the substrate is spinning at a very high speed, which can cause damage to the substrate and/or the slider.

As shown in FIG. 5B, because OD3 shows a higher ski-jump value (e.g., H1) than the ski-jump value (e.g., H2) for OD4 (as shown in FIG. 4), the slider contacts with the data surface of the substrate earlier for OD3 at the radius of about 47.8 mm than for OD4 where the slider contacts the data surface at the radius of about 47.9 mm. In this example, the total diameter of the substrate is 97 mm, with a total radius of 48.5 mm. Further, as shown in FIG. 5B, OD2 shows more fluctuation in the minimum fly heights at various radiuses than OD1 because OD2 has a higher radial waviness than OD1. As such, it can be estimated that OD2 represents a rougher data surface than does OD1.

FIG. 6A is an example diagram 600 illustrating fly height deviations for a curved substrate surface, according to some aspects. FIG. 6B is an example diagram 650 illustrating fly height deviations for a curved slider, according to some aspects. In the example of FIGS. 6A, the fly height is measured at a center of the slider 608. Similarly, in the example of FIG. 6B, the fly height is measured at a center of the slider 658. The fly height deviations on the surface of the substrate disk as mentioned above affect formation of air pressure between the disk surface and the head/slider (e.g., slider air bearing surface). As shown in FIG. 6A, due to fly height variations on the disk surface, a cross-section of a disk shows a curved disk surface 604 that is curved in a direction extending above the data surface of the substrate disk, while an air bearing surface of a slider 608 is flat. The curved disk surface 604 read by the slider 608 with the flat air bearing surface shown in FIG. 6A is effectively equivalent to a flat disk surface 654 of FIG. 6B read by a cambered air bearing surface of a slider 658. For example, the spacing between the curved disk surface 604 and the flat air bearing surface of the slider 608 is equivalent to the spacing between the flat disk surface 654 and the cambered air bearing surface of the slider 658. The fly height variations caused by a curved disk surface such as the curved disk surface 604 cause a curvature effect, where the pressure of the compressed air between the disk surface and the air bearing surface of the slider varies due to the curves/height variations. The spacing, which may also be referred to as a fly height, decreases when the disk surface 604 is curved or when the air bearing surface of the slider 658 is cambered.

FIG. 6C is an example diagram 670 for an uncurved disk surface 674 and an uncurved slider 678, according to some aspects. In the example of FIG. 6C, the fly height is measured at a center of the slider 678. As shown in FIG. 6C, when the disk surface 674 is flat without fly height variations and the air bearing surface of the slider 678 is flat, the spacing between the disk surface 674 and the air bearing surface of the slider 678 remains constant and does not change as in the examples of FIGS. 6A and 6B.

The fly height can be measured based on a touch down (TD) velocity and/or a heater power. The TD velocity is the velocity (e.g., revolution per minute (RPM)) at which the disk spins when the slider touches the disk surface. The cambered air bearing surface of the slider 658 as shown in FIG. 6B causes cambered air bearing that generates less air pressure than the flat air bearing surface of the slider 678 as shown in FIG. 6C. Hence, a disk spin speed (RPM) needs to be higher for the cambered air bearing surface to maintain the same fly height. If the disk spin speed is reduced from a higher RPM, at which a air bearing surface of a slider flics without contacting the disk surface, to a lower RPM, the air bearing surface eventually starts to contact the disk surface. Because the cambered air bearing generates less pressure, the contact (touch down) happens at a higher RPM than it would flat slider 678. Therefore, the TD velocity is higher for a case where the disk surface is curved (e.g., FIG. 6A or 6B) than a case where the disk surface is flat without fly height variations (e.g., FIG. 6C). The difference between the TD velocity for the flat disk surface and the TD velocity with the curved velocity may indicate a degree of curvature of the disk surface is, and thus may show the effect of the roll off. Therefore, by measuring the TD velocity, the fly height can be estimated.

If heater power is used to measure the fly height, a read/write element in a pole tip area of a head (within the slider) can be extended toward the disk surface by thermally protruding the pole tip. The amount of protrusion of the pole tip can be controlled by controlling a power applied to a heater positioned in the pole tip area. For example, if X watts of power applied to the heater is needed to cause the pole tip to protrude enough to contact the disk surface in a case where the disk surface is flat without fly height variations (e.g., FIG. 6C), X minus Y watts applied to the heater may be sufficient to cause the pole tip to protrude enough to contact the disk surface in a case where the disk surface is curved (e.g., FIG. 6A or 6B) because the air bearing surface of the slider is closer to the disk surface in such a case. The value Y may indicate a degree of curvature of the disk surface.

If the degree of curvature on the disk surface increases, the spacing/fly height decreases. With the decreased spacing/fly height, undesired contact between the air bearing surface of the slider and the disk surface may occur frequently, which negatively affects the reliability of the disk and/or the slider. The degree of the curvature on the disk surface may be expressed as an extreme radial curvature at extended position (XRCE) value indicating a roll-off value at a particular radius, where the XRCE or the roll-off value is a difference between a baseline point on the surface and the measured height on the surface and the baseline point is a height at the data surface of the substrate. As the roll-off value increases, the TD velocity increases because curves and/or roll-offs degrade the air bearing capability of the slider, requiring a higher TD velocity. Hence, by measuring the TD velocity, the roll-off value and the fly height may be estimated. Generally speaking, from the disk inner diameter (ID) and toward the OD, a higher TD velocity is measured, which means that a higher roll-off value or a lower fly height is estimated toward the OD. With the higher roll-off value toward the OD, the slider read performance deteriorates toward the OD.

Height variations within a small region such as an OD edge region may affect the disk read operations performed by the slider. Generally, the slider is able to move up and down to some degree to compensate for gradual minor height variations along the surface of the disk. For example, the slider may be supported by an elastic mechanism such as a spring beam, which allows some movement of the slider with a suspension effect. At least for this reason, gradual minor changes in the height along the surface of the disk may not adversely affect the slider's performance as the slider can move up and down to some degree to adapt to the gradual changes. However, there is a limit to these height changes to which the slider can adapt. For example, if the disk surface has too much curvature, then the slider may not be able to adapt to the reduced fly height due to the curvature. Further, local height variations under the slider may affect the performance of the slider. For example, physical contact between the slider and the disk surface may occur if there is a drastic height variation causing local height variations within a small area. Continuous or frequent contacts that are undesired between the slider and the disk surface may occur due to local height variations, especially near the OD. During a glide test of a disk, a head with contact sensors for the test is flown over a disk surface to find a contact between any defect on the disk surface and the head. Near the OD, the head during the test may contact the disk surface due to the curvature effects even if there is no defect on the disk surface. This type of contact with the disk surface often occurs continuously near the OD and thus the number of contacts counted and stored in memory increases very quickly. If this happens, the memory for storing the contact information about the contacts between the disk surface and the head can saturate. Hence, such undesired contacts may be referred to as overflows.

Figure 7:
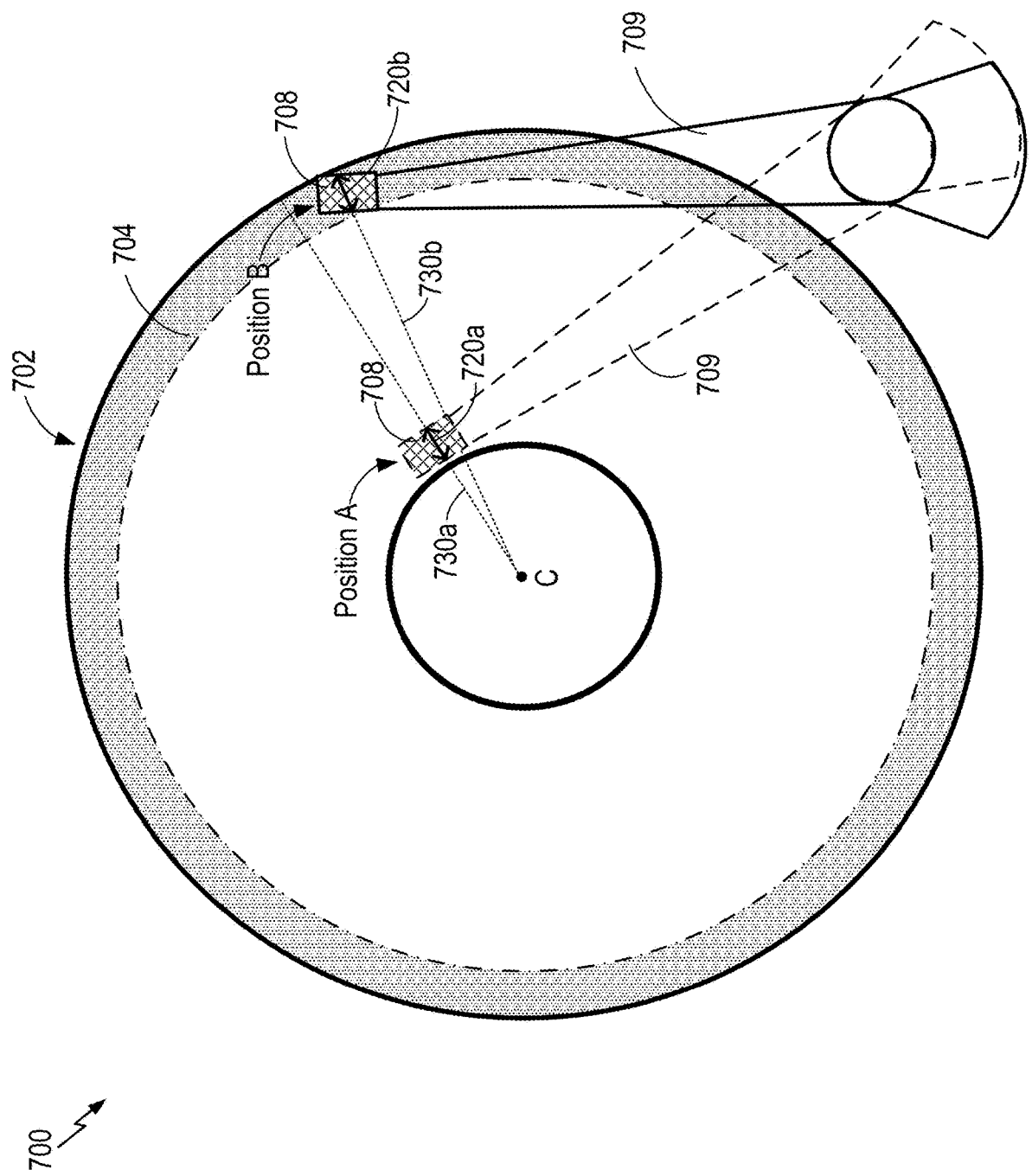
FIG. 7 is an example top plan view of a disk and head assembly and a slider showing example measurement lengths at different portions of a disk substrate, according to some aspects.

FIG. 7 illustrates a top plan view 700 of a disk substrate and head assembly and a slider showing example measurement lengths at different portions of a disk substrate, according to some aspects. FIG. 7 shows a top view of a disk substrate 702 and a slider 708 positioned at the end of a suspension 709 and above the substrate 702 at multiple positions. As shown in FIG. 7, the disk substrate 702 has an OD edge region 704 near an OD of the disk substrate 702. When the slider 708 is at Position A near an inner diameter (ID) of the disk substrate 702, a measurement line 720a that is on a straight radial line 730a toward the center (C) of the disk substrate 702 (e.g., a line or length across the slider body which is normal to the circular tracks extending along the disk, where this line/length will be parallel with a radial line of the substrate) is parallel or substantially parallel to a width of the slider 708 and has the same or substantially the same linear length as the width of the slider 708. Here, the center (C) is the center of the circle defined by the circularly shaped disk substrate 702. On the other hand, when the slider 708 is at the OD edge region 704 (e.g., near the OD), a measurement line 720b (e.g., that is on a straight radial line 730b toward the center (C) of the disk substrate 702) is at an angle from a line in the width direction of the slider 708.

The measurement line 720b may be referred to as a roll-off measurement line if the measurement line 720b is used to measure a roll-off value. The roll-off value is determined by determining a difference between the highest point and the lowest point in the OD edge region with reference to a roll-off measurement line, where the roll-off measurement line has a preselected length and is parallel to an air bearing surface of the slider. In an example, the highest point and the lowest point in the OD edge region with reference to the roll-off measurement line may be determined based TD velocities or another common measurement method for measuring a height on a surface (e.g., using an optical interferometry or a surface profiler). In the example shown in FIG. 7, the roll-off value at Position B may be measured based on a difference between the highest point and the lowest point in the OD edge region 704 with reference to the measurement line 720b. In some aspects, multiple roll-off values may be measured along multiple roll-off measurement lines on a surface of the substrate, where each of the multiple roll-off measurement lines is a straight radial line directed toward the center of the substrate.

Figure 8A:
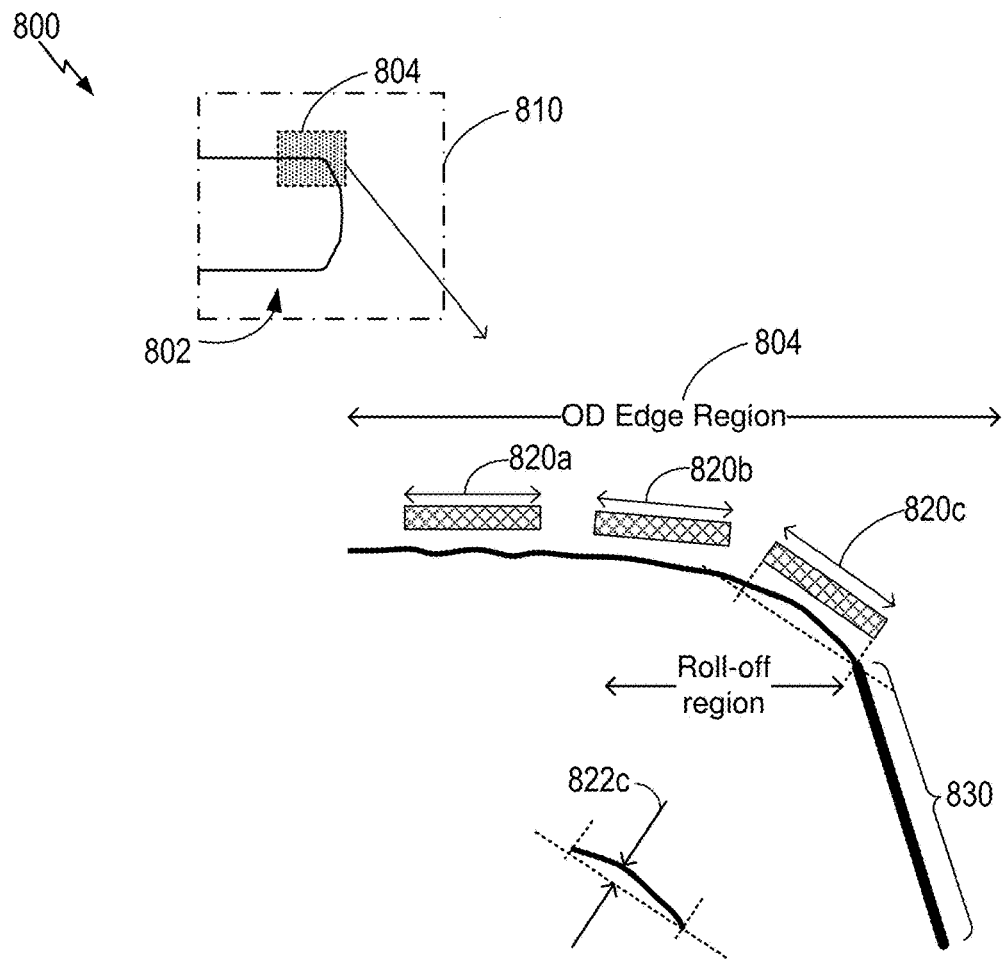
FIG. 8A is an example expanded view of OD edge illustrating measurements of the roll-off values of a substrate along multiple measurement lines/positions at an OD edge region of the substrate, according to some aspects.
Figure 8B:
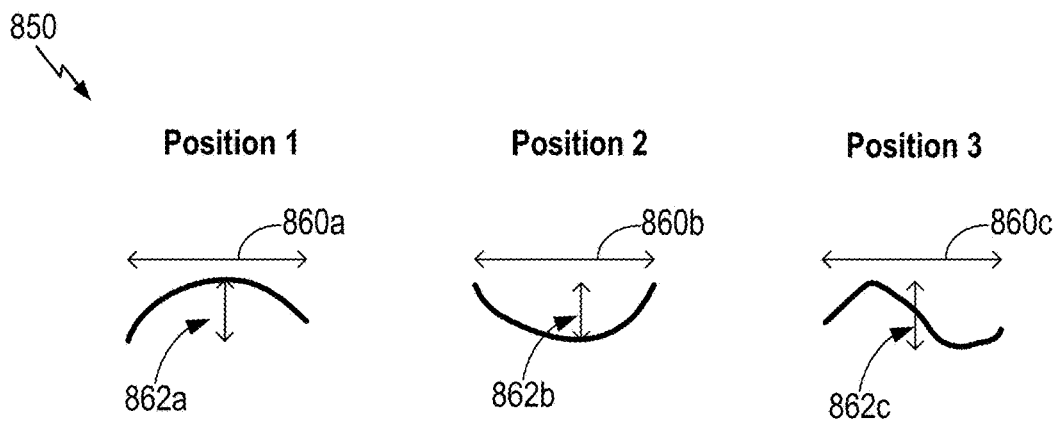
FIG. 8B illustrates different examples of measuring roll-off values of the substrate at three different positions, according to some aspects.

FIGS. 8A and 8B are example diagrams illustrating measurements of roll-off values of the substrate at various radial distances from the center of the substrate at an OD edge region, according to some aspects. FIG. 8A is an example expanded view 800 of the OD edge region illustrating measurements of the roll-off values of a substrate 802 along multiple measurement lines at an OD edge region of the substrate 802, according to some aspects. FIG. 8A shows a cross section view 810 of a portion of the substrate 802 near an OD of the substrate. For example, the cross section view 810 of FIG. 8A may correspond to the example diagram 350 of the cross section in FIG. 3. In FIG. 8A, the measurements of the roll-off values are made in the OD edge region 804 of the substrate 802. For example, the OD edge region 804 of the substrate 802 of FIG. 8A may correspond to the OD edge region 704 of the disk substrate 702 of FIG. 7. In FIG. 8A, the measurements of the roll-off values are made along the measurement lines 820a, 820b, and 820c on the surface of the substrate 802 at three respective distances from the center of the substrate, where each of the measurement lines 820a, 820b, and 820c is on a respective straight line directed toward the center axis of the substrate and has a length equal to the measurement length. Here, the center axis is an axis extending through the center of the substrate (see e.g., point "C" in FIG. 7) and normal to the data surface of the disk substrate, and the straight line is a line directed toward the center axis of the substrate and may or may not be parallel to the data surface of the substrate. In one example when the measurement is made within the measurement line 820c, a roll-off value 822c of the substrate measured within the measurement line 820c at this particular distance away from the center of the substrate is the difference between the highest point and the lowest point along the measurement line 820c.

FIG. 8B is an example diagram 850 showing different examples of measuring roll-off values of the substrate at three different positions, according to some aspects. In FIG. 8B, at Position 1, a first roll-off value 862a that is measured within a first measurement length 860a is the difference between the highest point and the lowest point on the surface of the substrate within the first measurement line 860a. At Position 2, a second roll-off value 862b that is measured within a second measurement length 860b is the difference between the highest point and the lowest point on the surface of the substrate within the first measurement line 860b. At Position 3, a second roll-off value 862c that is measured within a second measurement length 860c is the difference between the highest point and the lowest point on the surface of the substrate within the first measurement line 860c.

As discussed above, there are at least three factors that may indicate irregularities of a disk substrate, including a roll-off value, a ski-jump value, and a radial-waviness value. If an OD edge region of a substrate does not have a flat surface but has irregularities on a data surface, the fly height may undesirably fluctuate as the slider moves over the data surface to read data. Such irregularities on the data surface may often cause the slider to move too close to the data surface. A minimum fly height that is lower than a particular fly height threshold causes the slider to be too close to the data surface and thus may reduce reliability in reading the data. Each of the roll-off, the ski-jump, and the radial-waviness factors may cause the minimum fly height to fluctuate and to go lower than the fly height threshold, and may even cause the slider to contact the data surface. Hence, the roll-off value, the ski-jump value, and the radial-waviness value can be considered to determine whether a substrate is suitable for a magnetic medium.

According to some aspects of the disclosure, a roll-off value, a ski-jump value, and a radial-waviness value associated with a substrate for a magnetic medium of a data storage device are considered together to determine whether to utilize a given substrate, or a batch of similar substrates. In particular, for an OD edge region of the data surface of the substrate, a roll-off value, a ski-jump value, and a radial-waviness value are determined. Based on the roll-off value, the ski-jump value, and/or the radial-waviness value, a minimum fly height between a slider of the data storage device and a data surface of the substrate in the OD edge region is calculated. Subsequently, a result of comparison of this calculated minimum fly height and a fly height threshold is used to determine whether to utilize the substrate for the magnetic medium. For example, if the calculated minimum fly height is greater than or equal to a fly height threshold, it is determined that the substrate may be utilized for the magnetic medium. On the other hand, for example, if the calculated minimum fly height is less than the fly height threshold, the substrate is rejected for the magnetic medium.

Figure 9:
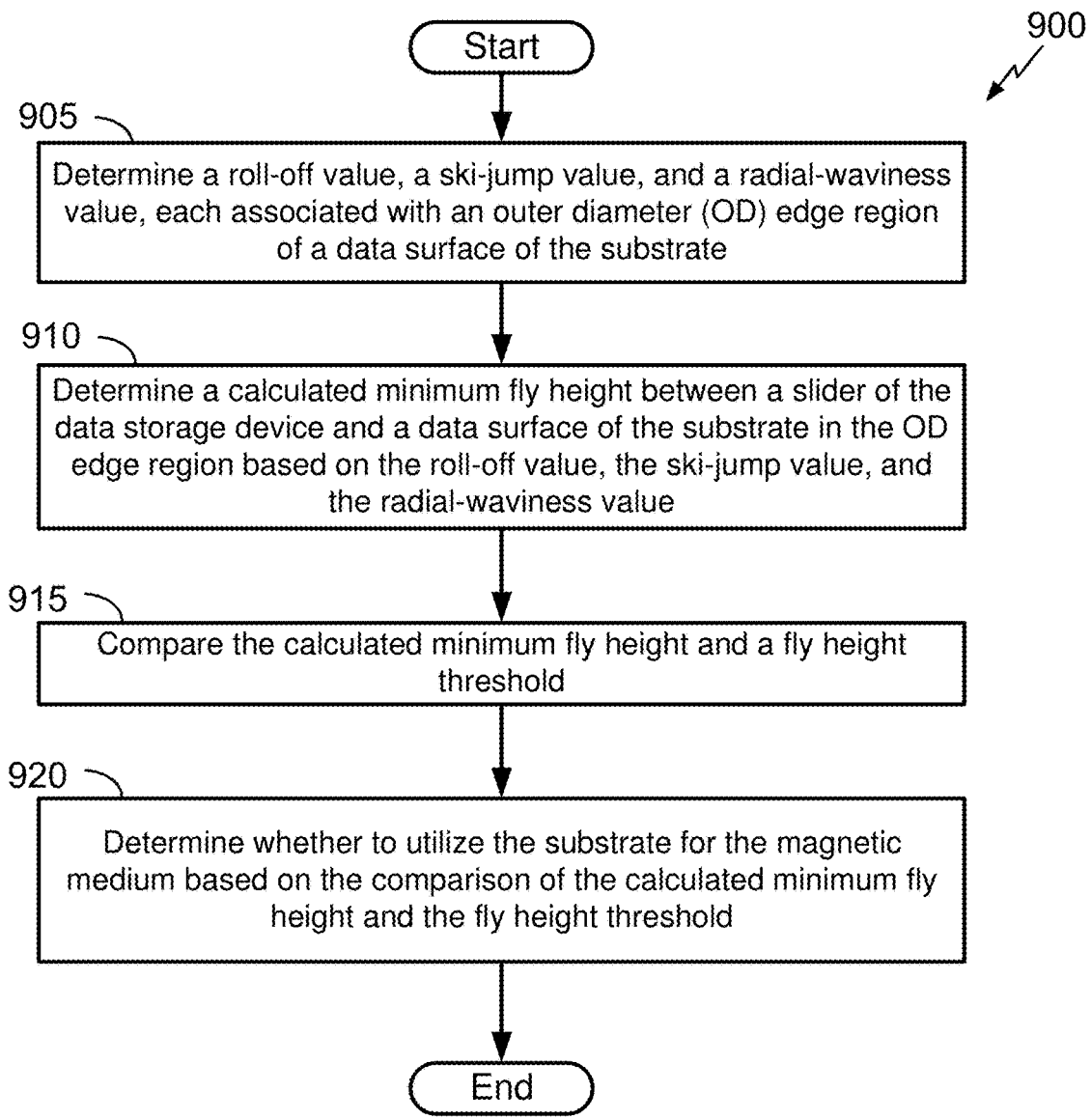
FIG. 9 is an example flow chart for identifying a substrate suitable for a magnetic medium of a data storage device configured for magnetic recording, according to some aspects.

FIG. 9 is an example flow chart 900 for identifying a substrate suitable for a magnetic medium of a data storage device configured for magnetic recording, according to some aspects. At block 905, a roll-off value, a ski-jump value, and a radial-waviness value, each associated with an OD edge region of a data surface of the substrate, are determined. At block 910, a calculated minimum fly height between a slider of the data storage device and a data surface of the substrate in the OD edge region is determined based on the roll-off value, the ski-jump value, and the radial-waviness value. At block 915, the calculated minimum fly height and a fly height threshold are compared. At block 920, a determination is made as to whether to utilize the substrate for the magnetic medium based on the comparison of the calculated minimum fly height and the fly height threshold.

As discussed above, the roll-off value is determined based on a difference between a highest point and a lowest point in the OD edge region with reference to a roll-off measurement line having a preselected length and parallel to an air bearing surface of the slider. The ski-jump value is determined based on a highest point with respect to the data surface in the OD edge region and the lowest point with respect to the data surface. The radial-waviness value is determined based on an average of a set of measured height values with respect to the data surface of the substrate within a preselected measurement area in the OD edge region. While these three values appear to be determined using some similar measurements, each is a different measurement characteristic that provides information on degrees of flatness at the OD edge region.

In some aspects, the calculated minimum fly height may be calculated based on a weighted roll-off value, a weighted ski-jump value, and a weighted radial-waviness value. The weighted roll-off value is calculated by multiplying the roll-off value by a first sensitivity factor. The weighted ski-jump value is calculated by multiplying the ski-jump value by a second sensitivity factor. The weighted radial-waviness value is calculated by multiplying the radial-waviness value by a third sensitivity factor. In some aspects, the calculated minimum fly height may be calculated by calculating a sum of the weighted roll-off value, the weighted ski-jump value, the weighted radial-waviness value, and a preselected safety margin. The preselected safety margin may be selected based on a desired sensitivity for rejecting the substrate for use as a magnetic medium. For example, a lower safety margin may be used to reject the substrate more easily, or a higher safety margin may be used to accept the substrate more easily to utilize for the magnetic medium.

For example, the calculated minimum fly height Fr may be calculated using the Equation 1 shown below.

$$F_c = k_1(\text{Roll\_Off}) + k_2(\text{Ski\_Jump}) + k_3(\text{Radial\_Waviness}) + M \quad (1)$$

In this example, the weighted roll-off value is expressed as $k_1$ (Roll_Off), where $k_1$ is the first sensitivity factor for fly height degradation and Roll_Off is the roll-off value. The weighted ski-jump value is expressed as $k_2$ (Ski_Jump), where $k_2$ is the first sensitivity factor for fly height degradation and Ski_Jump is the ski-jump value. The weighted radial-waviness value is expressed as $k_3$ (Radial_Waviness), where $k_3$ is the first sensitivity factor for fly height degradation and Radial_Waviness is the ski-jump value. M represents the preselected safety margin.

For example, the first sensitivity factor may range from 0.015 to 1.00, the second sensitivity factor may range from 0.0246 to 1.625, and the third sensitivity factor may range from 0037 to 0.2445. The preselected safety margin may range from 4 to 8 nanometers (nm).

The first, second, and third sensitivity factors are weighting factors that may be determined based on prior measurements and/or simulations. In some aspects, the first sensitivity factor (e.g., $k_1$) may be determined based on a relationship between multiple roll-off values that are pre-measured from various locations in OD edge region(s) of one or more substrates and corresponding minimum fly heights. In particular, the first sensitivity factor may be determined based on multiple (pre-measured) roll-off values associated with one or more substrates and multiple minimum fly heights respectively corresponding to the multiple roll-off values.

The multiple (pre-measured) roll-off values may be measured using OD profiles measured from one or more substrates, while the multiple minimum fly heights are determined by running an air bearing simulation (e.g., computer simulation) based on the measured OD profiles and characteristics of a particular slider. In particular, the multiple (pre-measured) roll-off values may be measured respectively at multiple roll-off measurement locations within one or more OD edge regions of the one or more substrates based on multiple measured OD profiles from the one or more substrates. In other words, the pre-measured roll-off values may be determined by measuring roll-off values at various roll-off measurement locations, where the roll-off measurement locations may be within an OD edge region of a substrate or within OD regions of multiple substrates. Further, the multiple minimum fly heights may be determined respectively for the multiple roll-off measurement locations based on an air bearing simulation of the multiple measured OD profiles of the one or more substrates. The results of the air bearing simulation may be different depending on what type of slider is considered for the air bearing simulation.

Figures 10A, 10B:
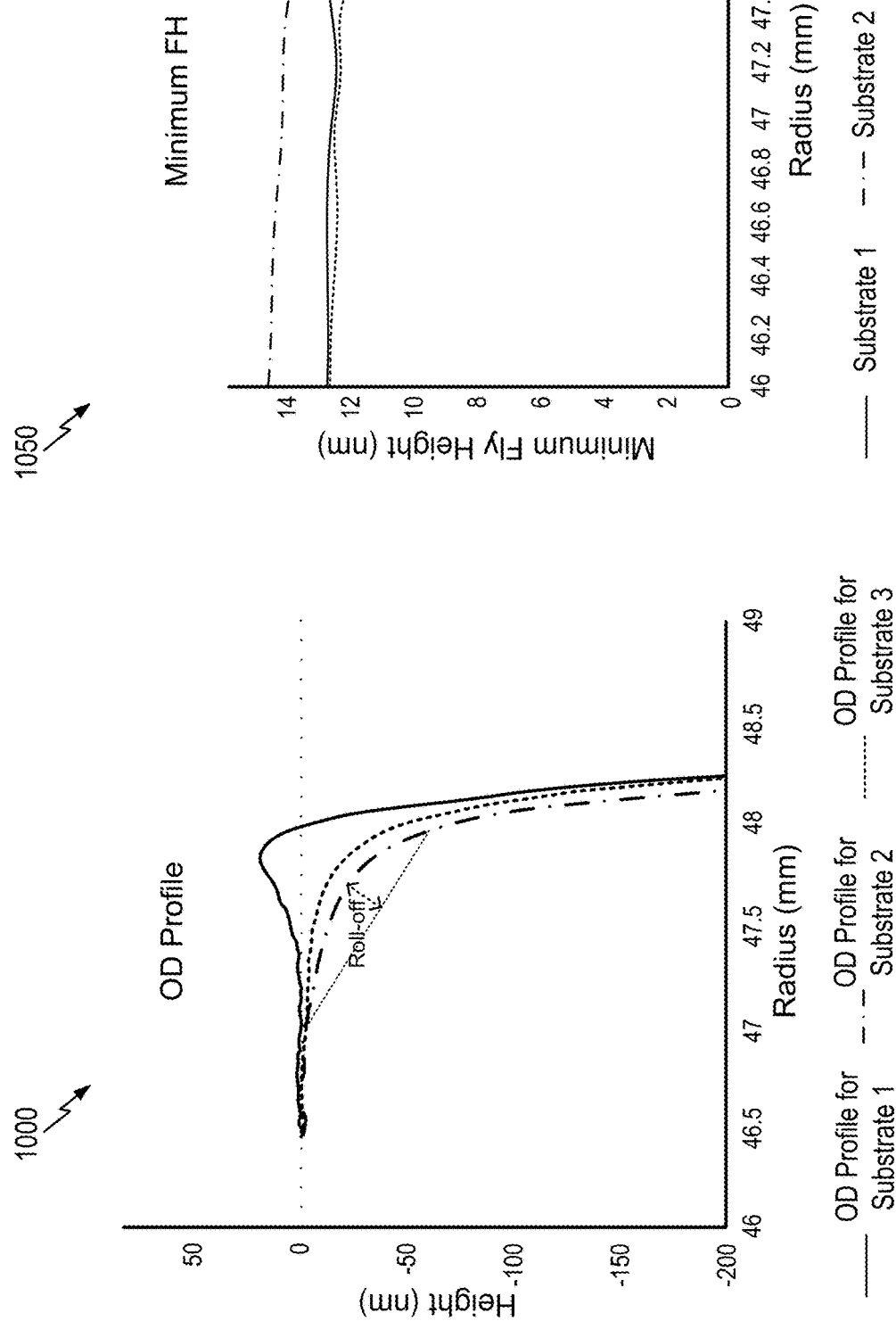
FIG. 10A is an example plot of OD profiles of three different example substrates, according to some aspects.
FIG. 10B is an example plot of minimum fly heights at various radiuses for three different example substrates within OD edge regions based on a simulation, according to some aspects.

FIG. 10A is an example plot 1000 of OD profiles of three different example substrates, according to some aspects. In this example, an OD edge region for each of the three example substrates starts at 46.5 mm in a radial direction, where each of the three example substrates has a total diameter of 97 mm (and a radius of 48.5 mm). The three OD profiles shown in FIG. 10A are measured from certain locations within OD edge regions of Substrate 1, Substrate 2, and Substrate 3, respectively, starting at 46.5 mm from the center of the substrate in a radial direction. As shown in FIG. 10A, the OD profile for Substrate 1 shows a ski-jump, while the OD profiles for Substate 2 and Substrate 3 show no ski-jump but only show roll-off regions. A ski-jump value may be obtained from each OD profile that shows a ski-jump.

FIG. 10B is an example plot 1050 of minimum fly heights at various radiuses for three different example substrates within OD edge regions based on a simulation, according to some aspects. In particular, the plot in FIG. 10B is obtained by running an air bearing simulation based on the measured OD profiles of FIG. 10A.

In an aspect, by combining the data on roll-off values obtained at roll-off measurement locations (e.g., at various radiuses) and the data on minimum fly heights at these roll-off measurement locations, data on the minimum fly heights respectively corresponding to the roll-off values may be obtained. After fitting a straight line through this resulting data on minimum fly heights and roll-off values, the first sensitivity factor may be determined based on a slope of the fitted straight line.

For example, referring to FIG. 10A, a roll off value of 500 nm is measured at the radius 47.5 mm for Substrate 3. Referring to FIG. 10B, the minimum fly height at the radius 47.5 mm is 11.8 nm for Substrate 3. Hence, by combining these two types of data, a data point with the minimum fly height of 11.8 nm corresponding to the roll-off value of 500 nm can be obtained, and then be used in the above noted plot of minimum fly heights and roll-off values to obtain the first sensitivity factor.

Figure 11B:
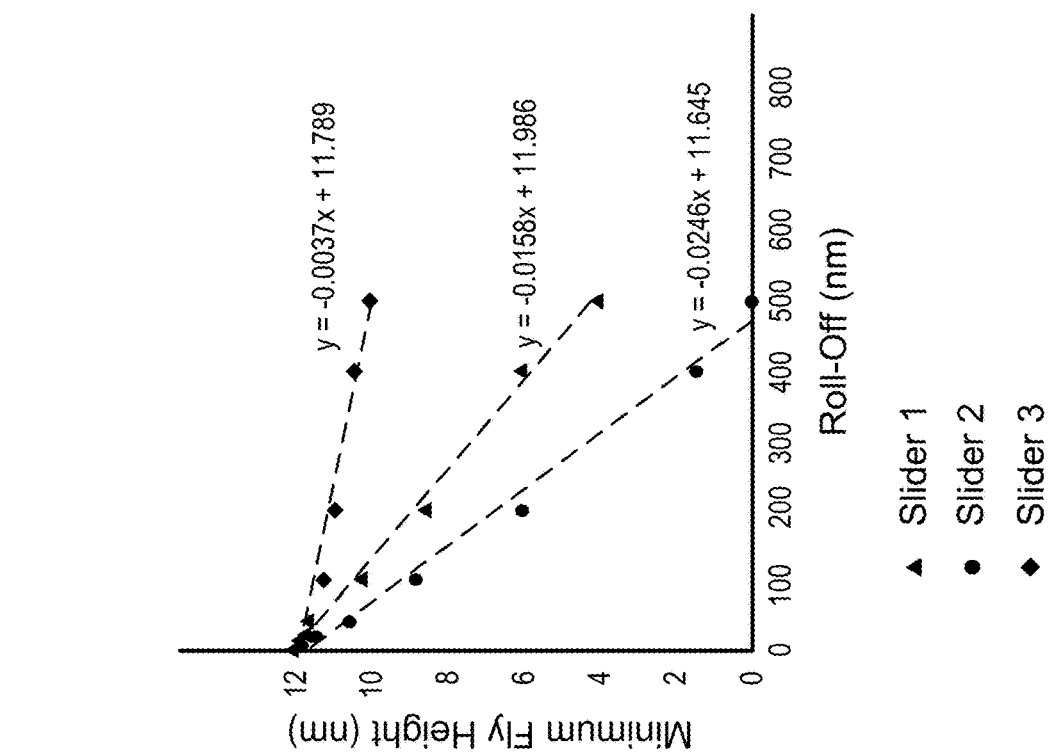
FIG. 11B is an example plot of minimum fly heights and roll-off values in a linear scale, according to some aspects.
Figure 11A:
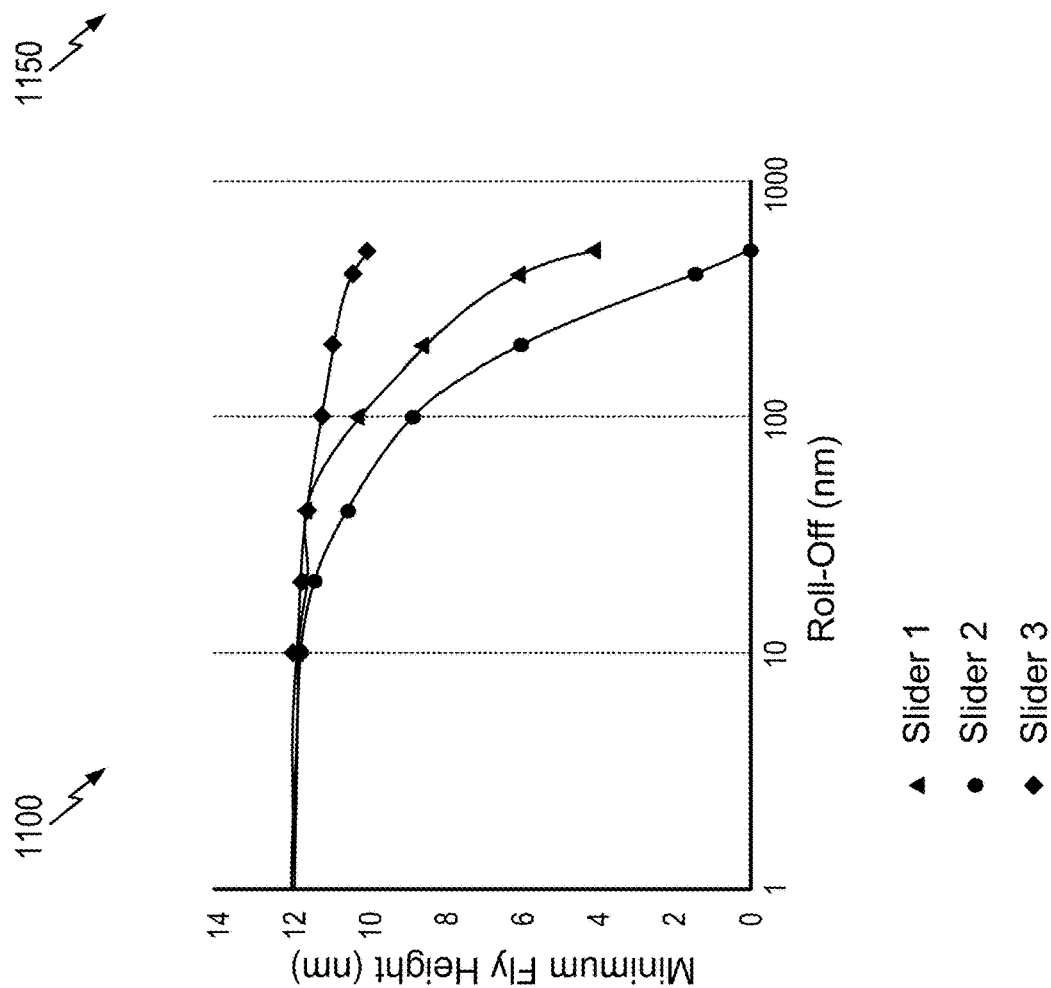
FIG. 11A is an example plot of minimum fly heights and roll-off values in a logarithmic scale, according to some aspects.

FIG. 11A is an example plot 1100 of minimum fly heights and roll-off values in a logarithmic scale, according to some aspects. FIG. 11B is an example plot 1150 of minimum fly heights and roll-off values in a linear scale, according to some aspects. As shown in FIG. 11A and FIG. 11B, the results may vary depending on the type of slider. FIG. 11A and FIG. 11B show minimum fly heights and roll-off values for three different types of sliders. Different types of sliders may have different air bearing surface characteristics, and thus may provide different minimum fly heights at various radiuses depending on the air bearing characteristics. Therefore, data on minimum fly heights respectively corresponding to the roll-off values may vary depending on the air bearing characteristics of different sliders. In FIG. 11B, a straight line is fitted to the data for minimum fly heights and roll-off values for each slider. For slider 1, the fitted straight line can be expressed as y=−0.0158x+11.986, and thus the first sensitivity factor for slider 1 is 0.0158. For slider 2, the fitted straight line can be expressed as y=−0.0246x+11.645, and thus the first sensitivity factor for slider 2 is 0.0246. For slider 3, the fitted straight line can be expressed as y=−0.0037x+11.789, and thus the first sensitivity factor for slider 3 is 0.0037.

In some aspects, the second sensitivity factor (e.g., $k_2$) is determined based on a relationship between multiple ski-jump values that are pre-measured from various locations in OD edge region(s) of one or more substrates and corresponding spacing loss values. A spacing loss value at a particular location may be obtained by determining the difference between a minimum fly height at a flat portion of the substrate (e.g., a portion away from the OD) and a minimum fly height at the particular location. In particular, the second sensitivity factor is determined based on multiple (pre-measured) ski-jump values associated with one or more substrates and multiple ski-jump spacing loss values respectively corresponding to the multiple ski-jump values.

The multiple (pre-measured) ski-jump values may be measured using OD profiles measured from one or more substrates, while the multiple ski-jump spacing loss values are determined by running an air bearing simulation (e.g., computer simulation) based on the measured OD profiles and characteristics of a particular slider. In particular, the multiple ski-jump values may be measured respectively at multiple ski-jump measurement locations within one or more OD edge regions of the one or more substrates based on multiple measured OD profiles of the one or more substrates. In other words, the pre-measured ski-jump values may be determined by measuring ski-jump values at various ski-jump measurement locations, where the ski-jump measurement locations may be within an OD edge region of a substrate or within OD regions of multiple substrates. Further, the multiple ski-jump spacing loss values are determined respectively for the multiple ski-jump measurement locations based on an air bearing simulation of the multiple measured OD profiles of the one or more substrates.

Figure 12B:
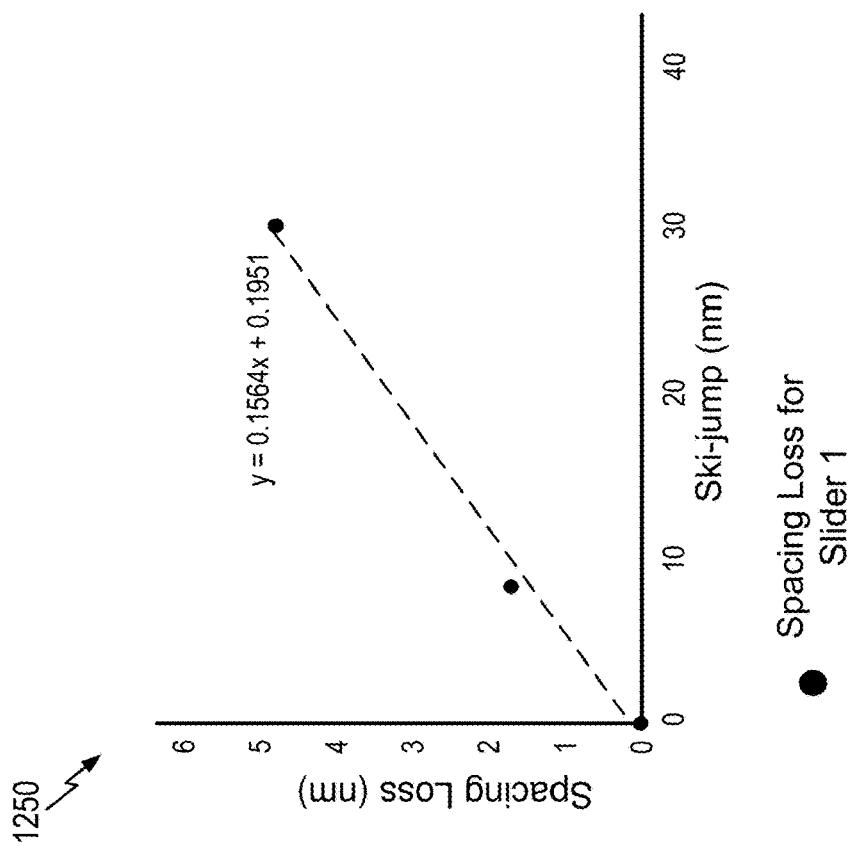
FIG. 12B is an example plot of ski-jump spacing loss values and ski-jump values, according to some aspects.
Figure 12A:
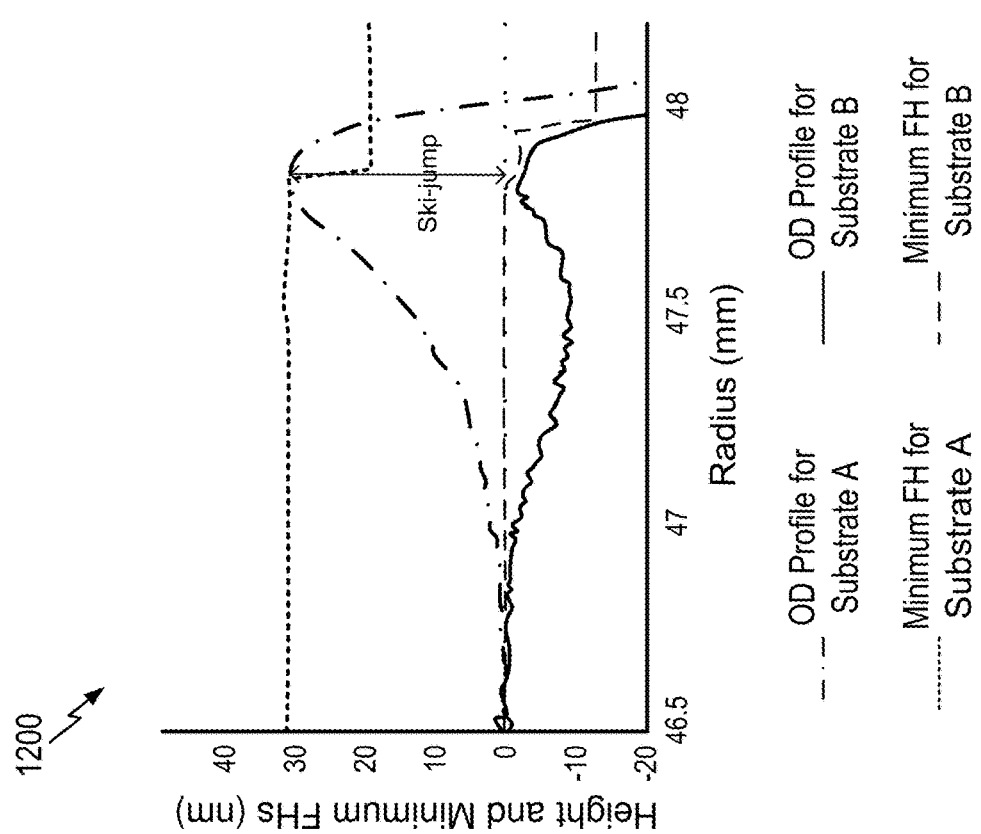
FIG. 12A is an example plot of OD profiles and minimum fly heights at various radiuses, according to some aspects.

FIG. 12A is an example plot 1200 of OD profiles and minimum fly heights at various radiuses, according to some aspects. The two OD profiles shown in FIG. 12A are measured from certain locations within OD edge regions of Substrate A and Substrate B, respectively, starting at 46.5 mm from the center of the substrate in a radial direction. FIG. 12A also shows a plot of minimum fly heights at various radiuses for each of the OD profiles, where the plots are obtained by running an air bearing simulation based on the measured OD profiles of FIG. 12A. Spacing loss values may be determined from the data on the minimum fly heights at various radiuses. As discussed above, a spacing loss value at a particular location may be obtained by determining a difference between a minimum fly height at a flat portion of the substrate away from the OD and a minimum fly height at the particular location. For example, because the minimum fly height is highest at the flat portion of the substrate among the minimum fly heights obtained via the air bearing simulation, the spacing loss value at a particular location may be obtained by subtracting a minimum fly height at the particular location from the highest minimum fly height among the minimum fly heights from the air bearing simulation. In the example shown in FIG. 12A, at around the location of 47.8 mm, the minimum fly height for Substrate A drops to approximately 20 nm, while the highest minimum fly height for Substrate A is approximately 30 nm. Hence, at the location of 47.8 mm, the spacing loss value is 5 nm, which is obtained by subtracting the minimum fly height 25 nm at the location of 47.8 mm from the highest minimum fly height 30 nm.

In some cases, an OD profile may show only a ski-jump, while another OD profile may show both a roll-off and a ski-jump. For example, as shown in FIG. 12A, the OD profile for Substrate A shows only a ski-jump, while the OD profile for Substrate B shows both a roll-off and a ski-jump, with the roll-off occurring before the ski-jump. When the OD profile shows both a roll-off and a ski-jump, in order to obtain the ski-jump spacing loss values used to determine the second sensitivity factor, roll-off spacing loss values (spacing loss due to the roll-off) are subtracted from corresponding total spacing loss values obtained from the air bearing simulation. Hence, in some aspects, the multiple ski-jump spacing loss values respectively corresponding to the multiple ski-jump values are estimated by subtracting multiple roll-off spacing loss values respectively from multiple total spacing loss values determined from the air bearing simulation. The roll-off spacing loss values (e.g., spacing loss values due to the roll-off and not caused by a ski-jump or a radial waviness) may be determined by minimum fly height simulations for the roll-off, without ski-jump or radial waviness values, or may be determined by a direct measurement between a slider head and transparent glass disk whose roll-off is determined by optical measurements.

In an aspect, by combining the data on ski-jump values obtained at ski-jump measurement locations (e.g., at various radiuses) and the data on spacing loss values at these ski-jump measurement locations, data on the spacing loss values respectively corresponding to the ski-jump values may be obtained. After fitting a straight line through the data on spacing loss values and ski-jump values, the second sensitivity factor may be determined based on a slope of the fitted straight line.

For example, referring to FIG. 12A, a ski-jump value of 30 nm is measured at the radius 47.8 mm for Substrate A. Further, referring to FIG. 12A, the ski-jump spacing loss value at the radius 47.8 mm where the ski-jump occurs is 10 nm for Substrate A. Hence, by combining these two types of data, a data point with the ski-jump spacing loss value of 5 nm corresponding to the ski-jump value of 30 nm can be obtained for Substrate A.

FIG. 12B is an example plot 1250 of ski-jump spacing loss values and ski-jump values, according to some aspects. In FIG. 12B, a straight line is fitted through data on ski-jump spacing loss values and ski-jump values. In the example shown in FIG. 12B, the fitted straight line can be expressed as y=0.1564x+0.1951, and thus the second sensitivity factor is 0.1546.

In some aspects, the third sensitivity factor (e.g., $k_3$) is determined based on a relationship between multiple radial-waviness values that are pre-measured from various locations in OD edge region(s) of one or more substrates and corresponding spacing loss values. In particular, the third sensitivity factor may be determined based on multiple radial-waviness values associated with one or more substrates and multiple waviness spacing loss values respectively corresponding to the multiple radial-waviness.

The multiple (pre-measured) radial-waviness values may be measured using OD profiles measured from one or more substrates, while the multiple waviness spacing loss values are determined by running an air bearing simulation (e.g., computer simulation) based on the measured OD profiles and characteristics of a particular slider. In an aspect, the multiple radial-waviness values are measured respectively at multiple radial-waviness measurement locations within one or more OD edge regions of the one or more substrates based on multiple measured OD profiles of the one or more substrates. In other words, the pre-measured radial-waviness values may be determined by measuring radial-waviness values at various radial-waviness locations, where the radial-waviness measurement locations may be within an OD edge region of a substrate or within OD regions of multiple substrates. Further, the multiple waviness spacing loss values are determined respectively for the multiple radial locations based on an air bearing simulation of the multiple measured OD profiles of the one or more substrates.

The multiple waviness spacing loss values respectively corresponding to the multiple radial-waviness values are estimated by subtracting multiple roll-off spacing loss values respectively from multiple total spacing loss values determined from the air bearing simulation. As discussed above, the roll-off spacing loss values (e.g., spacing loss values due to the roll-off and not caused by a ski-jump or a radial waviness) may be determined by minimum fly height simulations for the roll-off, without ski-jump or radial waviness values, or may be determined by a direct measurement between a slider head and transparent glass disk whose roll-off is determined by optical measurements.

Figures 13A, 13B:
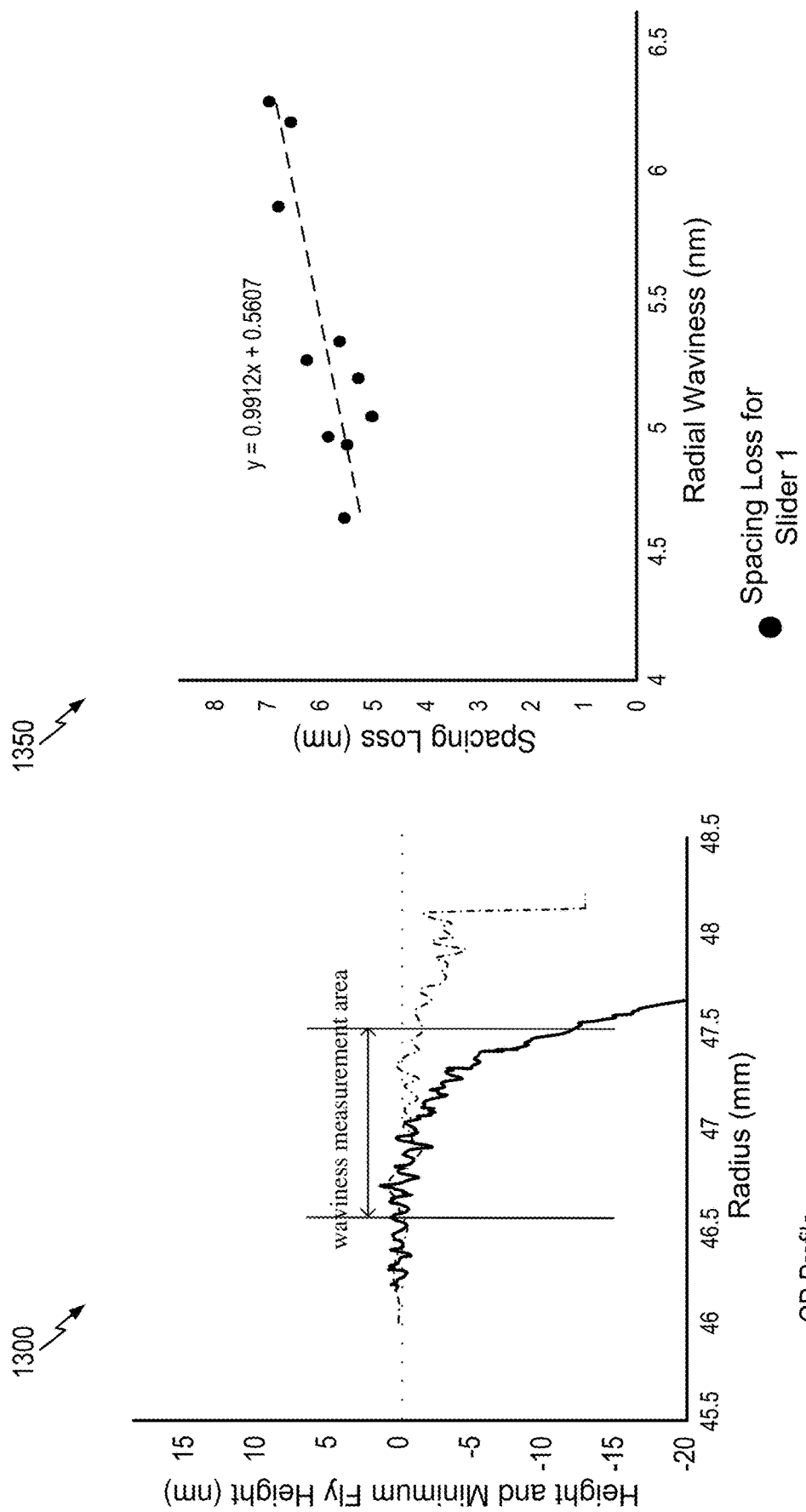
FIG. 13A is an example plot of OD profiles and minimum fly heights at various radiuses, according to some aspects.
FIG. 13B is an example plot of waviness spacing loss values and radial-waviness values, according to some aspects.

FIG. 13A is an example plot 1300 of OD profiles and minimum fly heights at various radiuses, according to some aspects. The OD profile shown in FIG. 13A is measured from certain locations within OD edge regions of a corresponding substrate, respectively, starting at 46.5 mm from the center of the substrate in a radial direction. FIG. 13A also shows a plot of minimum fly heights at various radiuses for the OD profile, where the plot is obtained by running an air bearing simulation based on the measured OD profile of FIG. 13A. As discussed above, spacing loss values may be determined from the data on the minimum fly heights at various radiuses. A spacing loss value at a particular location may be obtained by determining a difference between a minimum fly height at a flat portion of the substrate away from the OD and a minimum fly height at the particular location. For example, because the minimum fly height is highest at the flat portion of the substrate among the minimum fly heights obtained via the air bearing simulation, the spacing loss value at a particular location may be obtained by subtracting a minimum fly height at the particular location from the highest minimum fly height among the minimum fly heights from the air bearing simulation.

Radial-waviness values may be determined using OD profiles measured from one or more substrates. In the example of FIG. 13A, the radial-waviness value is determined within a waviness measurement area of 1 mm, by filtering a set of height values with respect to the data surface of the substrate within a preselected measurement area in the OD between, for example, 80 micrometer and 500 micrometer and calculating an average of the filtered set of height values within the preselected measurement area. In an example, for the filter window between 80 micrometer and 500 micrometer, the 500 micrometer end point is determined based on a length of a slider and 80 micrometer end point is determined empirically. The OD profile indicates height values at various radiuses. Hence, in FIG. 13A, the radial-waviness value at the radial location 47 mm is determined by taking an average of height values according to the OD profile between the radial locations at 46.5 mm and 47.5 mm. The preselected measurement area may correspond to a size of a slider.

FIG. 13B is an example plot 1350 of waviness spacing loss values and radial-waviness values, according to some aspects. In FIG. 13B, a straight line is fitted to the data on waviness spacing loss values and radial-waviness values. In the example shown in FIG. 13B, the fitted straight line can be expressed as y=0.9912x+0.5607, and thus the third sensitivity factor is 0.9912.

In an aspect, the first, second, and third sensitivity factors for various slider types may be determined based on limited determinations of the sensitivity factors, based on ratios of determined/known sensitivity factors. When all of the first, second, and third sensitivity factors for one slider type are determined and a particular sensitivity factor of the first, second, and third sensitivity factors is determined for all other slider types, then the remaining sensitivity factors for all other slider types may be determined based on a ratio of the particular sensitivity factor between sliders.

FIG. 14A is an example table 1400 related to an approach to determine sensitivity factors of different slider types based on ratios of known sensitivity factors, according to some aspects. In the example shown in FIG. 11B, the first sensitivity factor ($k_1$) of Slider 1, Slider 2, and Slider 3 is determined based on the air bearing simulation and measurements, as discussed above in reference to FIG. 11B. Further, in the example of FIG. 12B, the second sensitivity factor ($k_2$) is determined based on the air bearing simulation and measurements, as discussed above in reference to FIG. 12B. Similarly, the third sensitivity factor ($k_3$) is also determined based on the air bearing simulation and measurements, as discussed above in reference to FIG. 13B.

The second sensitivity factor ($k_2$) and the third sensitivity factor ($k_3$) of Slider 2 and the second sensitivity factor ($k_2$) and the third sensitivity factor ($k_3$) of Slider 3 can be determined using the sensitivity factors determined based on the air bearing simulation and measurements. In particular, a ratio of $k_1$ values between the slider types may be used to calculate the second sensitivity factor ($k_2$) and the third sensitivity factor ($k_3$) of Slider 2 and the second sensitivity factor ($k_2$) and the third sensitivity factor ($k_3$) of Slider 3. In the example of FIG. 14A, the ratio of the $k_1$ values between Slider 1 and Slider 2 is 0.015:0.0246, and the same ratio between Slider 1 and Slider 2 can be used to determine the second sensitivity factor ($k_2$) and the third sensitivity factor ($k_3$) of Slider 2. Further, in the example of FIG. 14A, the ratio of the $k_1$ values between Slider 1 and Slider 3 is 0.015:0.0037, and the same ratio between Slider 1 and Slider 3 can be used to determine the second sensitivity factor ($k_2$) and the third sensitivity factor ($k_3$) of Slider 3. By relying on the ratios of known sensitivity factor values for various slider types, other unknown sensitivity factors may be easily calculated/extrapolated without running an air bearing simulation or making measurements.

FIG. 14B is an example table 1450 of ranges for different sensitivity factors based on the sensitivity factors shown in FIG. 14A, according to some aspects. Based on the $k_1$, $k_2$, and $k_3$ values of FIG. 14A, it can be estimated that the $k_1$ value may range from 0.003 to 0.030, the $k_2$ value may range from 0.030 to 0.300, and the $k_3$ value may range from 0.200 to 2.000, in this example.

When determining whether to utilize the substrate for the magnetic medium, a single calculated minimum fly height may be compared with the fly height threshold or multiple calculated minimum fly heights may be compared with the fly height threshold. According to the approach utilizing a single calculated minimum fly height, the substrate may be utilized for the magnetic medium if the single calculated minimum fly height is greater than or equal to a fly height threshold, while the substrate is rejected for the magnetic medium if the single calculated minimum fly height is less than the fly height threshold.

According to the approach utilizing multiple calculated minimum fly heights, multiple roll-off values, multiple ski-jump values, and multiple radial-waviness values associated with the OD edge region of the substrate along respective multiple radial directions to the center of the substrate are determined. Then, each of the multiple calculated minimum fly heights is determined based on a respective roll-off value, a respective ski-jump value, and a respective radial waviness value. Subsequently, whether to utilize the substrate for the magnetic medium is determined based on comparing the multiple calculated minimum fly heights with the threshold. In some aspects, a percentage indicative of acceptable minimum fly heights (among the multiple calculated minimum fly heights) that are greater than or equal to the fly height threshold as compared to a total number of the multiple calculated minimum fly heights is determined. If the percentage of the acceptable minimum fly heights is greater than a pre-defined percentage threshold, the substrate may be utilized for the magnetic medium. If the percentage of the acceptable minimum fly heights is less than or equal to the pre-defined percentage threshold, the substrate is rejected for the magnetic medium. In an example, the percentage of the acceptable minimum fly heights may be 50% or about 50%.

FIG. 15A is an example diagram 1500 illustrating an approach of determining whether to utilize a substrate for a magnetic medium based on comparison of a single calculated minimum fly height and a fly height threshold, according to some aspects. FIG. 15A shows a top view of a substrate 1502 having an OD edge region 1504. In the example shown in FIG. 15A, a single calculated minimum fly height is determined at a single location within the OD edge region 1504. If the single calculated minimum fly height at this single location is greater than or equal to a fly height threshold, the substrate 1502 may be utilized for the magnetic medium. Otherwise, the substrate 1502 is rejected.

FIG. 15B is an example diagram 1550 illustrating an approach of determining whether to utilize a substrate for a magnetic medium based on comparison of multiple calculated minimum fly heights and a fly height threshold, according to some aspects. FIG. 15B shows a top view of a substrate 1552 having an OD edge region 1554. In the example shown in FIG. 15B, eight (8) calculated minimum fly heights are determined at eight (8) different locations within the OD edge region 1554, and are compared with the fly height threshold. If a percentage of acceptable minimum fly heights is greater than a pre-defined percentage threshold, the substrate 1552 may be utilized for the magnetic medium. Otherwise, the substrate 1552 is rejected.

Figure 16:
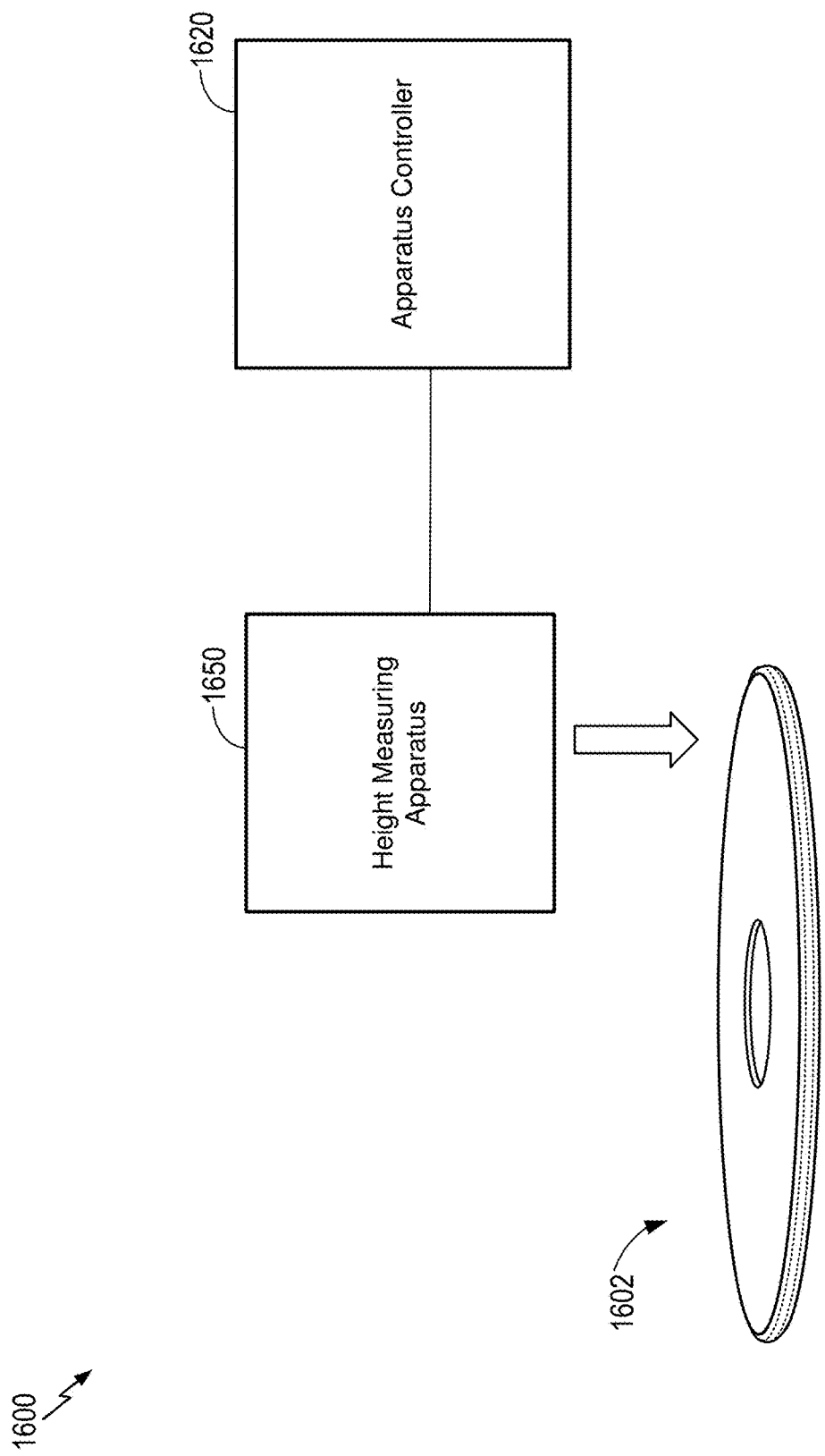
FIG. 16 illustrates an exemplary diagram for an apparatus for identifying a substrate suitable for a magnetic medium of a data storage device configured for magnetic recording, according to some aspects.

FIG. 16 illustrates an exemplary diagram for an apparatus 1600 for identifying a substrate suitable for a magnetic medium of a data storage device configured for magnetic recording, according to some aspects. In FIG. 16, the apparatus 1600 may include an apparatus controller 1620 and a height measuring apparatus 1650. In particular, the height measuring apparatus 1650 is configured to measure height values at various radial locations on a disk surface of the substrate 1602, and thus may be configured to generate an OD profile of the substrate 1602 at an OD edge region. The apparatus controller 1620 is configured to determine a roll-off value, a ski-jump value, and a radial-waviness value, each associated with an outer diameter (OD) edge region of a data surface of the substrate, where the roll-off value, the ski-jump value, and the radial-waviness value may be determined based on the information on the substrate 1602 obtained by the height measuring apparatus 1650. The apparatus controller 1620 is further configured to determine a calculated minimum fly height between a slider of the data storage device and a data surface of the substrate in the OD edge region based on the roll-off value, the ski-jump value, and the radial-waviness value. Subsequently, the apparatus controller 1620 is further configured to compare the calculated minimum fly height and a fly height threshold, and determine whether to utilize the substrate for the magnetic medium based on the comparison. There are several ways (equipment types) to measure height distribution of a disk surface. In one aspect, if heights of particular points are measured, they can be stitched together to cover the entire surface as long as the datum position is common for all measurements. Another way is to capture Newton rings from an entire surface and convert fringe information to height distributions.

Figure 17:
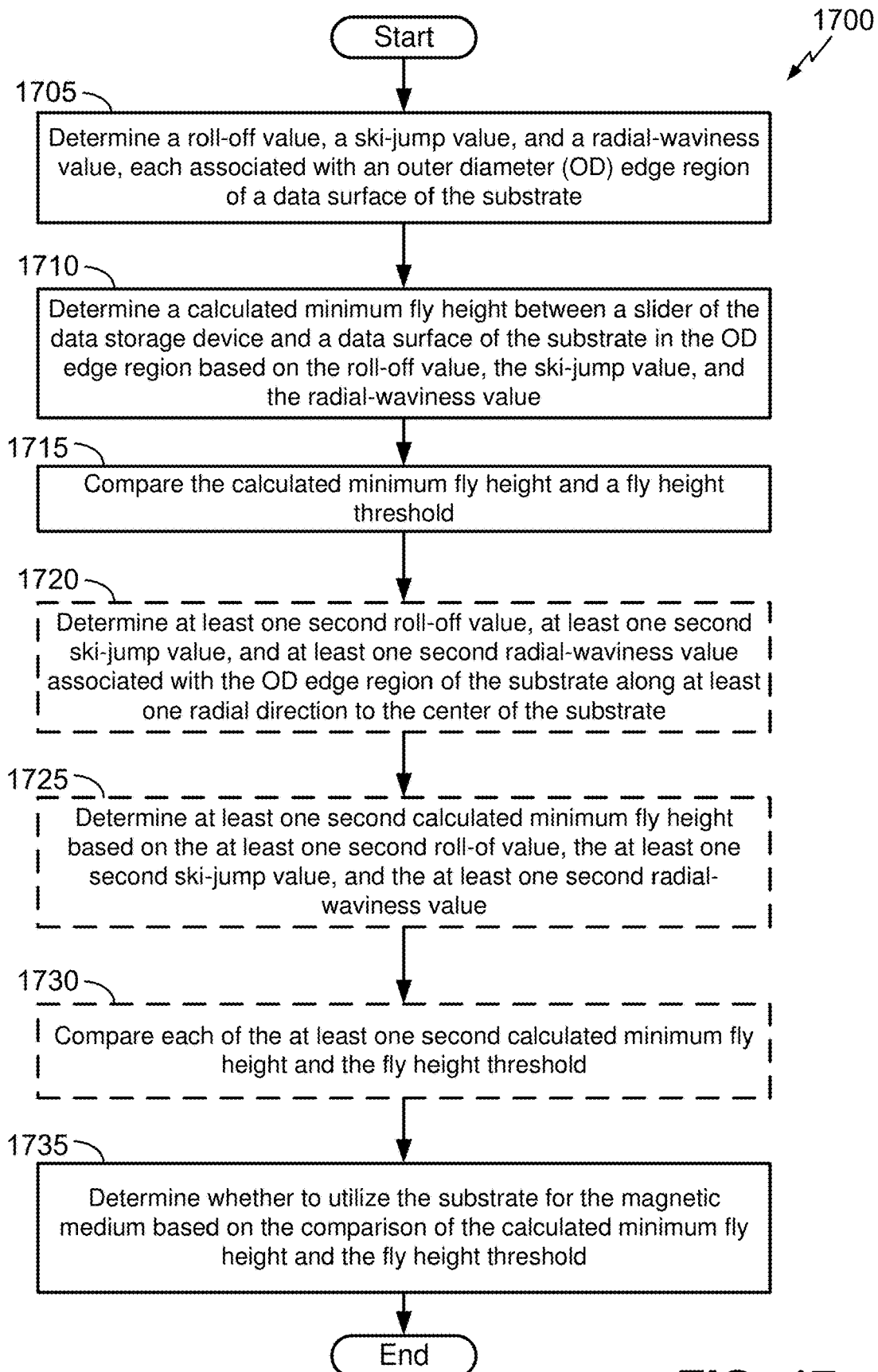
FIG. 17 illustrates a method of identifying a substrate suitable for a magnetic medium of a data storage device configured for magnetic recording, according to some aspects.

FIG. 17 illustrates a method 1700 for identifying a substrate suitable for a magnetic medium of a data storage device configured for magnetic recording, according to some aspects. In some aspects, the method 1700 may be performed by an apparatus for identifying a substrate suitable for a magnetic medium of a data storage device configured for magnetic recording, such as the apparatus 1600 of FIG. 16.

At block 1705, the apparatus determines a roll-off value, a ski-jump value, and a radial-waviness value, each associated with an outer diameter (OD) edge region of a data surface of the substrate. In an aspect, the roll-off value is determined based on a difference between a highest point and a lowest point in the OD edge region with reference to a roll-off measurement line having a preselected length and parallel to an air bearing surface of the slider, the ski-jump value is determined based on a highest point with respect to the data surface in the OD edge region and the lowest point with respect to the data surface, and the radial-waviness value is determined based on an average of a set of measured height values with respect to the data surface of the substrate within a preselected measurement area in the OD edge region.

At block 1710, the apparatus determines a calculated minimum fly height between a slider of the data storage device and a data surface of the substrate in the OD edge region based on the roll-off value, the ski-jump value, and the radial-waviness value.

In an aspect, the determining the calculated minimum fly height at block 1710 includes calculating the calculated minimum fly height based on a weighted roll-off value, a weighted ski-jump value, and a weighted radial-waviness value. In this aspect, the weighted roll-off value is calculated by multiplying the roll-off value by a first sensitivity factor, the weighted ski-jump value is calculated by multiplying the ski-jump value by a second sensitivity factor, and the weighted radial-waviness value is calculated by multiplying the radial-waviness value by a third sensitivity factor. In an aspect, the calculated minimum fly height is calculated by calculating a sum of the weighted roll-off value, the weighted ski-jump value, the weighted radial-waviness value, and a preselected safety margin.

In an aspect, the first sensitivity factor is determined based on a plurality of roll-off values associated with one or more substrates and a plurality of minimum fly heights respectively corresponding to the plurality of roll-off values. In this aspect, the plurality of roll-off values are measured respectively at a plurality of roll-off measurement locations within one or more OD edge regions of the one or more substrates based on a plurality of measured OD profiles of the one or more substrates, and the plurality of minimum fly heights are determined respectively for the plurality of roll-off measurement locations based on an air bearing simulation of the plurality of measured OD profiles of the one or more substrates.

In an aspect, the second sensitivity factor is determined based on a plurality of ski-jump values associated with one or more substrates and a plurality of ski-jump spacing loss values respectively corresponding to the plurality of ski-jump values. In this aspect, the plurality of ski-jump values are measured respectively at a plurality of ski-jump measurement locations within one or more OD edge regions of the one or more substrates based on a plurality of measured OD profiles of the one or more substrates, and the plurality of ski-jump spacing loss values are determined respectively for the plurality of ski-jump measurement locations based on an air bearing simulation of the plurality of measured OD profiles of the one or more substrates. In this aspect, the plurality of ski-jump spacing loss values respectively corresponding to the plurality of ski-jump values are estimated by subtracting a plurality of roll-off spacing loss values respectively from a plurality of total spacing loss values determined from the air bearing simulation.

In an aspect, the third sensitivity factor is determined based on a plurality of radial-waviness values associated with one or more substrates and a plurality of spacing loss values respectively corresponding to the plurality of radial-waviness. In this aspect, the plurality of radial-waviness values are measured respectively at a plurality of radial-waviness measurement locations within one or more OD edge regions of the one or more substrates based on a plurality of measured OD profiles of the one or more substrates, and the plurality of waviness spacing loss values are determined respectively for the plurality of radial locations based on an air bearing simulation of the plurality of measured OD profiles of the one or more substrates. In this aspect, the plurality of waviness spacing loss values respectively corresponding to the plurality of radial-waviness values are estimated by subtracting a plurality of roll-off spacing loss values respectively from a plurality of total spacing loss values determined from the air bearing simulation.

At block 1715, the apparatus compares the calculated minimum fly height and a fly height threshold.

In an aspect, at block 1720, the apparatus may determine at least one second roll-off value, at least one second ski-jump value, and at least one second radial-waviness value associated with the OD edge region of the substrate along at least one radial direction to the center of the substrate. In this aspect, at block 1725, the apparatus may determine at least one second calculated minimum fly height based on the at least one second roll-off value, the at least one second ski-jump value, and the at least one second radial-waviness value. Further, in this aspect, at block 1730, the apparatus may compare each of the at least one second calculated minimum fly height and the fly height threshold.

At block 1735, the apparatus may determine whether to utilize the substrate for the magnetic medium based on the comparison of the calculated minimum fly height and the fly height threshold.

In an aspect, the determining whether to utilize the substrate for the magnetic medium based on the comparison of the calculated minimum fly height and the fly height threshold at block 1735 includes determining to utilize the substrate for the magnetic medium in response to the calculated minimum fly height being greater than or equal to a fly height threshold, and determining to reject the substrate for the magnetic medium in response to the calculated minimum fly height being less to the fly height threshold.

In an aspect, the determining whether to utilize the substrate for the magnetic medium based on the comparison of the calculated minimum fly height and the fly height threshold at block 1735 includes determining whether to utilize the substrate for the magnetic medium based on the comparison of the calculated minimum fly height and the fly height threshold and the comparison of each of the at least one second calculated minimum fly height and the fly height threshold. In this aspect, the determining whether to utilize the substrate for the magnetic medium based on the comparison of the calculated minimum fly height and the fly height threshold and the comparison of each of the at least one second calculated minimum fly height and the fly height threshold includes: determining a percentage indicative of acceptable minimum fly heights among the calculated minimum fly height and the at least one second calculated minimum fly height that are greater than or equal to the fly height threshold as compared to a total number of the calculated minimum fly heights, determining to utilize the substrate for the magnetic medium when the percentage of the acceptable minimum fly heights is greater than a predefined percentage threshold, and determining to utilize the substrate for the magnetic medium when the percentage of the acceptable minimum fly heights is greater than a predefined percentage threshold.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on. The term about 'value X'", or "approximately value X," as used in the disclosure shall mean within 10 percent of the 'value X'. For example, a value of about 1 or approximately 1, would mean a value in a range of 0.9-1.1. In one aspect, "about" as used herein may instead mean 5 percent. In this disclosure, various numerical values are presented. Unless specifically indicated otherwise, it is contemplated that these numerical values may have a tolerance of 10 percent. In another aspect, the tolerance may be 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. Various components described in this specification may be described as "including" or made of certain materials or compositions of materials. In one aspect, this can mean that the component consists of the particular material(s). In another aspect, this can mean that the component comprises the particular material(s).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A method for identifying a substrate suitable for a magnetic medium of a data storage device configured for magnetic recording, comprising:
   determining a roll-off value, a ski-jump value, and a radial-waviness value, each associated with an outer diameter (OD) edge region of a data surface of the substrate;
   determining a calculated minimum fly height between a slider of the data storage device and a data surface of the substrate in the OD edge region based on the roll-off value, the ski-jump value, and the radial-waviness value;
   comparing the calculated minimum fly height and a fly height threshold; and
   determining whether to utilize the substrate for the magnetic medium based on the comparison of the calculated minimum fly height and the fly height threshold.

2. The method of claim 1, wherein the roll-off value is determined based on a difference between a highest point and a lowest point in the OD edge region with reference to a roll-off measurement line having a preselected length and parallel to an air bearing surface of the slider, the ski-jump value is determined based on a highest point with respect to the data surface in the OD edge region and the lowest point with respect to the data surface, and the radial-waviness value is determined based on an average of a set of measured height values with respect to the data surface of the substrate within a preselected measurement area in the OD edge region.

3. The method of claim 1, wherein the determining the calculated minimum fly height comprises calculating the calculated minimum fly height based on a weighted roll-off value, a weighted ski-jump value, and a weighted radial-waviness value,
   wherein the weighted roll-off value is calculated by multiplying the roll-off value by a first sensitivity factor,
   wherein the weighted ski-jump value is calculated by multiplying the ski-jump value by a second sensitivity factor, and
   wherein the weighted radial-waviness value is calculated by multiplying the radial-waviness value by a third sensitivity factor.

4. The method of claim 3, wherein the calculated minimum fly height is calculated by calculating a sum of the weighted roll-off value, the weighted ski-jump value, the weighted radial-waviness value, and a preselected safety margin.

5. The method of claim 3, wherein the first sensitivity factor is determined based on a plurality of roll-off values associated with one or more substrates and a plurality of minimum fly heights respectively corresponding to the plurality of roll-off values.

6. The method of claim 5, wherein the plurality of roll-off values are measured respectively at a plurality of roll-off measurement locations within one or more OD edge regions of the one or more substrates based on a plurality of measured OD profiles of the one or more substrates, and
   wherein the plurality of minimum fly heights are determined respectively for the plurality of roll-off measurement locations based on an air bearing simulation of the plurality of measured OD profiles of the one or more substrates.

7. The method of claim 3, wherein the second sensitivity factor is determined based on a plurality of ski-jump values associated with one or more substrates and a plurality of ski-jump spacing loss values respectively corresponding to the plurality of ski-jump values.

8. The method of claim 7, wherein the plurality of ski-jump values are measured respectively at a plurality of ski-jump measurement locations within one or more OD edge regions of the one or more substrates based on a plurality of measured OD profiles of the one or more substrates, and
   wherein the plurality of ski-jump spacing loss values are determined respectively for the plurality of ski-jump measurement locations based on an air bearing simulation of the plurality of measured OD profiles of the one or more substrates.

9. The method of claim 8, wherein the plurality of ski-jump spacing loss values respectively corresponding to the plurality of ski-jump values are estimated by subtracting a plurality of roll-off spacing loss values respectively from a plurality of total spacing loss values determined from the air bearing simulation.

10. The method of claim 3, wherein the third sensitivity factor is determined based on a plurality of radial-waviness values associated with one or more substrates and a plurality of waviness spacing loss values respectively corresponding to the plurality of radial-waviness.

11. The method of claim 10, wherein the plurality of radial-waviness values are measured respectively at a plurality of radial-waviness measurement locations within one or more OD edge regions of the one or more substrates based on a plurality of measured OD profiles of the one or more substrates, and
   wherein the plurality of waviness spacing loss values are determined respectively for the plurality of radial locations based on an air bearing simulation of the plurality of measured OD profiles of the one or more substrates.

12. The method of claim 11, wherein the plurality of waviness spacing loss values respectively corresponding to the plurality of radial-waviness values are estimated by subtracting a plurality of roll-off spacing loss values respectively from a plurality of total spacing loss values determined from the air bearing simulation.

13. The method of claim 1, wherein determining whether to utilize the substrate for the magnetic medium based on the comparison of the calculated minimum fly height and the fly height threshold comprises:
   determining to utilize the substrate for the magnetic medium in response to the calculated minimum fly height being greater than or equal to a fly height threshold; and
   determining to reject the substrate for the magnetic medium in response to the calculated minimum fly height being less to the fly height threshold.

14. The method of claim 1, further comprising:
   determining at least one second roll-off value, at least one second ski-jump value, and at least one second radial-waviness value associated with the OD edge region of the substrate along at least one radial direction to the center of the substrate;
   determining at least one second calculated minimum fly height based on the at least one second roll-of value, the at least one second ski-jump value, and the at least one second radial-waviness value; and
   comparing each of the at least one second calculated minimum fly height and the fly height threshold,
   wherein determining whether to utilize the substrate for the magnetic medium based on the comparison of the calculated minimum fly height and the fly height threshold comprises:

determining whether to utilize the substrate for the magnetic medium based on the comparison of the calculated minimum fly height and the fly height threshold and the comparison of each of the at least one second calculated minimum fly height and the fly height threshold.

15. The method of claim 14, wherein determining whether to utilize the substrate for the magnetic medium based on the comparison of the calculated minimum fly height and the fly height threshold and the comparison of each of the at least one second calculated minimum fly height and the fly height threshold comprises:
determining a percentage indicative of acceptable minimum fly heights among the calculated minimum fly height and the at least one second calculated minimum fly height that are greater than or equal to the fly height threshold as compared to a total number of the calculated minimum fly heights;
determining to utilize the substrate for the magnetic medium when the percentage of the acceptable minimum fly heights is greater than a pre-defined percentage threshold; and
determining to reject the substrate for the magnetic medium when the percentage of the acceptable minimum fly heights is less than or equal to the pre-defined percentage threshold.

16. A method for identifying a substrate suitable for a magnetic medium of a data storage device configured for magnetic recording, comprising:
determining a roll-off value, a ski-jump value, and a radial-waviness value, each associated with an outer diameter (OD) edge region of a data surface of the substrate;
determining a calculated minimum fly height between a slider of the data storage device and a data surface of the substrate in the OD edge region based on the roll-off value, the ski-jump value, and the radial-waviness value;
determining whether the calculated minimum fly height is less than a fly height threshold;
determining, responsive to a determination that the calculated minimum fly height is greater than or equal to the fly height threshold, to use the substrate within the magnetic medium of the data storage device; and
determining, responsive to a determination that the calculated minimum fly height is less than the fly height threshold, not to use the substrate within the magnetic medium of the data storage device.

17. The method of claim 16, wherein the roll-off value is determined based on a difference between a highest point and a lowest point in the OD edge region with reference to a roll-off measurement line having a preselected length and parallel to an air bearing surface of the slider, the ski-jump value is determined based on a highest point with respect to the data surface in the OD edge region and the lowest point with respect to the data surface, and the radial-waviness value is determined based on an average of a set of measured height values with respect to the data surface of the substrate within a preselected measurement area in the OD edge region.

18. The method of claim 16, wherein the determining the calculated minimum fly height comprises calculating the calculated minimum fly height based on a weighted roll-off value, a weighted ski-jump value, and a weighted radial-waviness value,
wherein the weighted roll-off value is calculated by multiplying the roll-off value by a first sensitivity factor,
wherein the weighted ski-jump value is calculated by multiplying the ski-jump value by a second sensitivity factor, and
wherein the weighted radial-waviness value is calculated by multiplying the radial-waviness value by a third sensitivity factor.

19. The method of claim 18, wherein the calculated minimum fly height is calculated by calculating a sum of the weighted roll-off value, the weighted ski-jump value, the weighted radial-waviness value, and a preselected safety margin.

20. The method of claim 18, wherein the first sensitivity factor is determined based on a plurality of roll-off values associated with one or more substrates and a plurality of minimum fly heights respectively corresponding to the plurality of roll-off values,
wherein the second sensitivity factor is determined based on a plurality of ski-jump values associated with the one or more substrates and a plurality of ski-jump spacing loss values respectively corresponding to the plurality of ski-jump values, and
wherein the third sensitivity factor is determined based on a plurality of radial-waviness values associated with the one or more substrates and a plurality of spacing loss values respectively corresponding to the plurality of radial-waviness.

* * * * *